| (12) | United States Patent | (10) Patent No.: US 11,419,073 B2 |
|---|---|---|
|  | Gage | (45) Date of Patent: Aug. 16, 2022 |

(54) METHOD AND APPARATUS FOR SYNCHRONISING WIRELESS COMMUNICATIONS

(71) Applicant: William Anthony Gage, Stittsville (CA)

(72) Inventor: William Anthony Gage, Stittsville (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 109 days.

(21) Appl. No.: 16/819,990

(22) Filed: Mar. 16, 2020

(65) Prior Publication Data

US 2020/0305101 A1 Sep. 24, 2020

Related U.S. Application Data

(60) Provisional application No. 62/841,761, filed on May 1, 2019, provisional application No. 62/821,245, filed on Mar. 20, 2019.

(51) Int. Cl.
*H04W 56/00* (2009.01)
*H04W 72/04* (2009.01)
(Continued)

(52) U.S. Cl.
CPC .......... *H04W 56/001* (2013.01); *H04B 1/713* (2013.01); *H04L 1/0003* (2013.01);
(Continued)

(58) Field of Classification Search
CPC ............... H04W 56/001; H04W 72/04; H04W 72/0406; H04W 72/042; H04W 76/00;
(Continued)

(56) References Cited

U.S. PATENT DOCUMENTS

| 2003/0096627 A1* | 5/2003 | Rasanen ............... H04W 28/18 |
|---|---|---|
|  |  | 455/466 |
| 2013/0235858 A1 | 9/2013 | Zhao et al. |

(Continued)

FOREIGN PATENT DOCUMENTS

WO 2017202267 A1 11/2017

OTHER PUBLICATIONS

"Industrial communication networks—Fieldbus specifications"; Part 4-12: Data-link layer protocol specification—Type 12 elements; BSI Standards Publication; BS EN 61158-4-12:2014.

(Continued)

*Primary Examiner* — Warner Wong

(57) ABSTRACT

Method and apparatus, for synchronising communications between a radio access network (RAN) node and a wireless device (WD) provisioned with a set of synchronised communication configurations. The method comprises, after receiving, by the RAN node, a downstream protocol data unit (PDU), selecting a synchronised communication configuration from the set of synchronised communication configurations where each synchronised communication configuration includes a downlink portion governing downlink data transmissions to the WD, an uplink portion governing uplink data transmissions from the WD, and a sidelink portion governing sidelink data transmissions between WDs, respective ones of the set of synchronised communication configurations being associated with a periodic communications synchronisation indicator (PCSI). The method further includes transmitting, by the RAN node to the WD, the PCSI associated with the selected synchronised communication configuration, transmitting, by the RAN node to the WD, at a pre-determined interval following transmission of the PCSI, the downstream PDU in accordance with the downlink portion of the selected synchronised communication configuration, and receiving, by the RAN node, an (Continued)

upstream PDU transmitted by the WD in accordance with the uplink portion of the selected synchronised communication configuration.

20 Claims, 13 Drawing Sheets

(51) Int. Cl.
*H04W 76/11* (2018.01)
*H04B 1/713* (2011.01)
*H04L 1/00* (2006.01)
*H04L 5/10* (2006.01)
*H04L 5/00* (2006.01)
*H04B 7/26* (2006.01)

(52) U.S. Cl.
CPC .............. *H04L 5/0051* (2013.01); *H04L 5/10* (2013.01); *H04W 72/042* (2013.01); *H04W 72/0446* (2013.01); *H04W 72/0453* (2013.01); *H04W 76/11* (2018.02); *H04B 7/2662* (2013.01)

(58) Field of Classification Search
CPC ... H04W 76/10; H04W 76/11; H04W 72/044; H04W 72/0453; H04W 72/0446; H04W 56/002; H04W 56/00–0095; H04B 1/713; H04B 1/7156; H04B 7/2662; H04L 1/0001; H04L 1/0003; H04L 5/0048; H04L 5/0051; H04L 5/02; H04L 5/06; H04L 5/10; H04L 7/00–10; H04J 3/06–125
See application file for complete search history.

(56) References Cited

U.S. PATENT DOCUMENTS

| | | |
|---|---|---|
| 2018/0191563 A1 | 7/2018 | Farmanbar et al. |
| 2019/0109694 A1* | 4/2019 | Zhou ........................ H04L 5/14 |
| 2020/0037268 A1* | 1/2020 | Zhang .................... H04L 5/0051 |
| 2020/0120652 A1* | 4/2020 | Shen ................... H04W 72/0466 |
| 2020/0404617 A1* | 12/2020 | Murray ............. H04W 52/0229 |
| 2021/0022186 A1* | 1/2021 | Liu ....................... H04W 74/006 |
| 2021/0084672 A1* | 3/2021 | Gulati .................... H04W 56/00 |
| 2021/0195576 A1* | 6/2021 | Balasubramanian ........................ H04W 72/085 |
| 2021/0212050 A1* | 7/2021 | Lu .......................... H04L 5/0094 |
| 2021/0219269 A1* | 7/2021 | Lee ........................ H04W 72/02 |
| 2021/0250913 A1* | 8/2021 | Ganesan ............ H04W 72/0446 |
| 2021/0250931 A1* | 8/2021 | Yang .................... H04W 72/044 |
| 2021/0258922 A1* | 8/2021 | Xiao ...................... H04W 72/02 |
| 2021/0258997 A1* | 8/2021 | Khoshnevisan .. H04W 72/1289 |

OTHER PUBLICATIONS

"Evolved Universal Terrestrial Radio Access (E-UTRA) and Evolved Universal Terrestrial Radio Access Network (E-UTRAN); Overall description; Stage 2"; 3GPP TS 36.300 V15.4.0 (Dec. 2018).

"Evolved Universal Terrestrial Radio Access (E-UTRA); Radio Resource Control (RRC); Protocol specification"; 3GPP TS 36.331 V15.4.0 (Dec. 2018).

"3rd Generation Partnership Project; Technical Specification Group Radio Access Network; NR; Physical channels and modulation"; 3GPP TS 38.211 V15.4.0 (Dec. 2018).

"3rd Generation Partnership Project; Technical Specification Group Radio Access Network; NR; Multiplexing and channel coding"; 3GPP TS 38.212 V15.4.0 (Dec. 2018).

"3rd Generation Partnership Project; Technical Specification Group Radio Access Network; NR; NR and NG-RAN Overall Description; Stage 2"; 3GPP TS 38.300 V15.4.0 (Dec. 2018).

"3rd Generation Partnership Project; Technical Specification Group Radio Access Network; NR; Medium Access Control (MAC) protocol specification"; 3GPP TS 38.321 V15.4.0 (Dec. 2018).

"3rd Generation Partnership Project; Technical Specification Group Radio Access Network; NR; Radio Resource Control (RRC) protocol specification"; 3GPP TS 38.331 V15.4.0 (Dec. 2018).

"3rd Generation Partnership Project; Technical Specification Group Radio Access Network; NG-RAN; Architecture description"; 3GPP TS 38.401 V15.4.0 (Dec. 2018).

* cited by examiner

1000

```
┌─────────────────────────────────────────────────────────────┐
│ During a PCSI monitoring occasion, receive a periodic        │ 1010
│ communications synchronisation indicator (PCSI)              │
└─────────────────────────────────────────────────────────────┘
                              ↓
┌─────────────────────────────────────────────────────────────┐
│ Identify a synchronised communication configuration          │ 1020
│ associated with the PCSI from a set of synchronised          │
│ communication configurations                                 │
└─────────────────────────────────────────────────────────────┘
                              ↓
┌─────────────────────────────────────────────────────────────┐
│ Identify an activation time interval                         │ 1030
└─────────────────────────────────────────────────────────────┘
                              ↓
┌─────────────────────────────────────────────────────────────┐
│ At a time after reception of the PCSI indicated by the       │ 1040
│ activation time interval, activate the synchronised          │
│ communication configuration                                  │
└─────────────────────────────────────────────────────────────┘
                              ↓
┌─────────────────────────────────────────────────────────────┐
│ Receive a downstream PDU according to the downlink portion   │ 1050
│ of the activated synchronised communication configuration    │
└─────────────────────────────────────────────────────────────┘
                              ↓
┌─────────────────────────────────────────────────────────────┐
│ Transmit an upstream PDU according to the uplink portion of  │ 1060
│ the activated synchronised communication configuration       │
└─────────────────────────────────────────────────────────────┘
```

FIG. 10A

METHOD AND APPARATUS FOR SYNCHRONISING WIRELESS COMMUNICATIONS

CROSS REFERENCE TO RELATED APPLICATIONS

This application claims priority to U.S. provisional patent application Ser. No. 62/821,245 filed Mar. 20, 2019 and entitled "Method and Apparatus for Synchronising Wireless Communications", and U.S. provisional patent application Ser. No. 62/841,761 filed May 1, 2019 and entitled "A Method and Apparatus for Fieldbus Communications using Wireless Links", the contents of which are incorporated herein by reference as if reproduced in their entirety.

FIELD OF THE INVENTION

The present invention pertains to the field of packet-based data communications in a wireless network and in particular to a method and apparatus for synchronising communications within the wireless network.

BACKGROUND

A radio access network (RAN) node in a Third Generation Partnership Project (3GPP) Fifth Generation (5G) system may be connected to a core network (CN) control plane entity through an N2 interface (also known as an NG-C interface) and to a CN user plane entity through an N3 interface (also known as an NG-U interface). The CN control plane entity is also connected to user equipment (UE) through an N1 interface. In a 3GPP Long Term Evolution (LTE) system, similar interfaces exist.

A RAN node is also connected to a wireless device (WD) such as user equipment (UE) via a radio link interface (also known as Uu) that comprises several entities associated with the radio link protocol stack: a physical layer (PHY) entity, a medium access control (MAC) entity, a radio link control (RLC) entity, a packet data convergence protocol (PDCP) entity, a service data adaptation protocol (SDAP) entity, and a radio resource control (RRC) entity.

Process control systems are examples of systems may be implemented using RAN nodes and WDs of 3GPP wireless systems. In a process control system, such as that used for factory automation, a process loop control master (PLC-M) periodically transmits downstream process loop control protocol data units (PLC PDUs) to one or more process loop control devices (PLC-D) attached to a fieldbus and receives upstream PLC PDUs from those PLC-Ds, the upstream PLC PDUs being transmitted in response to the downstream PLC PDUs. The downstream transmission of PLC PDUs and the reception of corresponding upstream PLC PDUs at the PLC-M is known as a process loop control (PLC) cycle. The duration of the PLC cycle is a fixed value that is determined by the process requirements.

The foregoing background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for synchronising communications between a radio access network node and a wireless device in a wireless communication system.

Embodiments herein provide, in one aspect, a method for synchronising communications between a radio access network (RAN) node and a wireless device (WD) provisioned with a set of synchronised communication configurations. The method comprises, receiving, by the RAN node, a downstream protocol data unit (PDU), selecting a synchronised communication configuration from the set of synchronised communication configurations where each synchronised communication configuration includes a downlink portion governing downlink data transmissions to the WD, an uplink portion governing uplink data transmissions from the WD and a sidelink portion governing sidelink data transmissions from the WD to a neighbouring WD, respective ones of the set of synchronised communication configurations being associated with a periodic communications synchronisation indicator (PCSI). The method further includes transmitting, by the RAN node to the WD, the PCSI associated with the selected synchronised communication configuration, transmitting, by the RAN node to the WD, at a pre-determined interval following transmission of the PCSI, the downstream PDU in accordance with the downlink portion of the selected synchronised communication configuration, and receiving, by the RAN node, an upstream PDU transmitted by the WD in accordance with the uplink portion of the selected synchronised communication configuration.

The method further includes transmitting, by the RAN node to the WD, the PCSI associated with the selected synchronised communication configuration, transmitting, by the RAN node to the WD, at a pre-determined interval following transmission of the PCSI, the downstream PDU in accordance with the downlink portion of the selected synchronised communication configuration, and receiving, by the RAN node, an upstream PDU transmitted by the neighbouring WD in accordance with the uplink portion of the selected synchronised communication configuration, the upstream PDU associated with a sidestream PDU transmitted by the WD to the neighbouring WD in accordance with the sidelink portion of the selected synchronised communication configuration.

Advantages associated with the use of a synchronised communications configuration with a downlink portion, an uplink portion and a sidelink portion include providing a compact signalling mechanism that coordinates one or more downlink, uplink and sidelink transmissions that are triggered by the arrival of a downstream PDU.

In another aspect, the PCSI is valid for a single process loop control (PLC) cycle, and the downstream PDU is transmitted to the WD and the upstream PDU is received from the WD during the PLC cycle.

In another aspect, the downlink portion defines, for each of the set of synchronised communication configurations, parameters and radio resources for downlink data transmissions of downstream PDUs from the RAN node to the WD, the uplink portion defines parameters and radio resources for uplink data transmissions of upstream PDUs from the WD to the RAN node, and the sidelink portion defines parameters and radio resources for sidelink data transmissions of sidestream PDUs from the WD to the neighbouring WD.

In another aspect, parameters and radio resources comprises one or more of:
 an initial time domain resource allocation, including sub-frame offset, start symbol and number of symbols;

an initial frequency domain resource allocation, including a starting resource block and a number of resource blocks;

a modulation and coding scheme;

a demodulation reference signal;

a number of transmission repetitions;

a time interval between initial and repeated transmissions, if time domain diversity is used;

a frequency offset between initial and repeated transmissions, if frequency domain diversity is used;

a redundancy version (RV) sequence to use for repetitions (i.e., repeated transmissions);

a frequency hopping configuration for repeated transmissions;

a time domain interval for subsequent resource allocations, including number of nanoseconds, number of symbols, number of slots and number of sub-frames; and a frequency domain interval for subsequent resource allocations, including number of resource blocks, bandwidth part identifier, and component carrier identifier.

In another aspect, the PCSI comprises an unmodulated signal.

In another aspect, the PCSI comprises a downlink control information (DCI) message that is encoded with a radio network temporary identifier (RNTI).

In another aspect, the DCI message includes an identifier associated with the selected synchronised communication configuration.

In another aspect, receiving the downstream PDU comprises receiving, by the RAN node, the downstream PDU from a user plane (UP) component.

In accordance with another aspect, a radio access network (RAN) node is provided. The RAN node comprises a network interface for receiving and transmitting protocol data units (PDUs), a radio network interface for wirelessly receiving and transmitting PDUs, a processor; and a memory device storing instructions that when executed by the processor cause the RAN node to: after receiving a downstream PDU using the network interface, select a synchronised communication configuration from a set of synchronised communication configurations where each synchronised communication configuration includes a downlink portion for downlink data transmissions and an uplink portion for uplink data transmissions, respective ones of the set of synchronised communication configurations being associated with a periodic communications synchronisation indicator (PCSI), transmit, using the radio network interface, a PCSI associated with the selected synchronised communication configuration, transmit, using the radio network interface, at a pre-determined interval following transmission of the PCSI, the downstream PDU in accordance with the downlink portion of the selected synchronised communication configuration, and receive, using the radio network interface, an upstream PDU in accordance with the uplink portion of the selected synchronised communication configuration.

In accordance with another aspect, the RAN node further comprises a memory device storing instructions that when executed by the processor cause the RAN node to: receive a downstream PDU using the network interface; select a synchronised communication configuration from a set of synchronised communication configurations where each synchronised communication configuration includes a downlink portion for downlink data transmissions, an uplink portion for uplink data transmissions and a sidelink portion for sidelink data transmissions, respective ones of the set of synchronised communication configurations being associated with a periodic communications synchronisation indicator (PCSI); transmit, using the radio network interface, a PCSI associated with the selected synchronised communication configuration; transmit, using the radio network interface, at a pre-determined interval following transmission of the PCSI, the downstream PDU in accordance with the downlink portion of the selected synchronised communication configuration; and receive, using the radio network interface, an upstream PDU in accordance with the uplink portion of the selected synchronised communication configuration, the upstream PDU associated with a sidestream PDU transmitted by the WD to a neighbouring WD in accordance with the sidelink portion of the selected synchronised communication configuration.

Embodiments of the present invention provide advantages by way of allowing a radio access network node to synchronise use of pre-configured radio resources with the arrival of user plane data. Disclosed embodiments avoid shortcomings associated with conventional configured scheduling where radio resources may be wasted if data is not available when a transmission opportunity occurs and where additional delays are incurred if data must be buffered until the next scheduled transmission opportunity.

Embodiments herein also avoid shortcomings associated with dynamic scheduling which requires that a WD expend battery power to continually monitor transmissions on the physical downlink control channel (PDCCH) and where increased radio resources are required for PDCCH transmissions when data is being scheduled in short time intervals to reduce latency.

Also provided, in accordance with another aspect, is a method comprising receiving, at a wireless device (WD), a periodic communications synchronisation indicator (PCSI) from a radio access network (RAN) node, retrieving, from a memory of the WD, a synchronised communication configuration associated with the PCSI from a set of provisioned synchronised communication configurations stored therein, each synchronised communication configuration of the set including a downlink portion governing downlink data transmissions and an uplink portion governing uplink data transmissions between the RAN node and the WD, causing, at a pre-determined interval following reception of the PCSI, activation of the synchronised communication configuration associated with the PCSI, receiving, by the WD from the RAN node, a downstream protocol data unit (PDU) in accordance with the downlink portion of the synchronised communication configuration associated with the PCSI, and transmitting, by the WD to the RAN node, an upstream PDU in accordance with the uplink portion of the synchronised communication configuration associated with the PCSI.

The method further includes receiving, at the WD, a PCSI from the RAN node; retrieving, from a memory of the WD, a synchronised communication configuration associated with the PCSI from a set of provisioned synchronised communication configurations stored therein, each synchronised communication configuration of the set including a downlink portion governing downlink data transmissions from the RAN node to the WD, an uplink portion governing uplink data transmissions from the WD to the RAN node and a sidelink portion governing sidelink data transmissions from the WD to a neighbouring WD; causing, at a pre-determined interval following reception of the PCSI, activation of the synchronised communication configuration associated with the PCSI; receiving, by the WD from the RAN node, a downstream protocol data unit (PDU) in accordance with the downlink portion of the synchronised communication configuration associated with the PCSI; and transmitting, by the WD to the neighbouring WD, a sidestream PDU in accordance with the sidelink portion of the synchronised communication configuration associated with the PCSI, Also provided, in accordance with another aspect, is a wireless device (WD) comprising a radio network interface for receiving and transmitting protocol data units (PDUs), a processor and a memory device storing instructions that when executed by the processor cause the WD to: receive a periodic communications synchronisation indicator (PCSI), retrieve, from a memory of the WD, a synchronised communication configuration associated with the PCSI from a set of synchronised communication configurations stored therein, each synchronised communication configuration of the set including a downlink portion for downlink data transmissions and an uplink portion for uplink data transmissions, cause, at a pre-determined interval following reception of the PCSI, activation of the synchronised communication configuration associated with the PCSI, receive a downstream PDU in accordance with the downlink portion of the synchronised communication configuration associated with the PCSI, and transmit an upstream PDU in accordance with the uplink portion of the synchronised communication configuration associated with the PCSI.

Also provided, in accordance with another aspect, is a wireless device (WD) comprising a radio network interface for receiving and transmitting protocol data units (PDUs), a processor and a memory device storing instructions that when executed by the processor cause the WD to: receive a periodic communications synchronisation indicator (PCSI); retrieve, from a memory of the WD, a synchronised communication configuration associated with the PCSI from a set of synchronised communication configurations stored therein, each synchronised communication configuration of the set including a downlink portion governing downlink data transmissions, an uplink portion governing uplink data transmissions and a sidelink portion governing sidelink data transmissions; cause, at a pre-determined interval following reception of the PCSI, activation of the synchronised communication configuration associated with the PCSI; receive a downstream PDU in accordance with the downlink portion of the synchronised communication configuration associated with the PCSI; and transmit a sidestream PDU in accordance with the sidelink portion of the synchronised communication configuration associated with the PCSI.

Also provided, in accordance with another aspect, is a wireless device (WD) comprising a radio network interface for receiving and transmitting protocol data units (PDUs), a processor and a memory device storing instructions that when executed by the processor cause the WD to: receive a periodic communications synchronisation indicator (PCSI); retrieve, from a memory of the WD, a synchronised communication configuration associated with the PCSI from a set of synchronised communication configurations stored therein, each synchronised communication configuration of the set including a downlink portion governing downlink data transmissions, an uplink portion governing uplink data transmissions and a sidelink portion governing sidelink data transmissions; cause, at a pre-determined interval following reception of the PCSI, activation of the synchronised communication configuration associated with the PCSI; receive a first sidestream PDU in accordance with the sidelink portion of the synchronised communication configuration associated with the PCSI; and transmit a second sidestream PDU in accordance with the sidelink portion of the synchronised communication configuration associated with the PCSI.

Among other advantages provided by embodiments herein, each synchronised communications configuration identifies parameters and radio resources for one or more downlink transmissions that may be triggered by the arrival of a downstream PDU at the RAN node. A synchronised communications configuration may also identity parameters and radio resources for one or more uplink transmissions that may be triggered by one or more of the downlink transmissions.

In some embodiments, when a WD detects transmission of a PCSI, it may activate the corresponding synchronised communications configuration at a pre-determined interval following receipt of the PCSI. This has the advantage of activating a coordinated set of downlink and uplink transmission configurations based on reception of a corresponding PCSI.

A synchronised communications configuration may also identity parameters and radio resources for a coordinated set of one or more sidelink transmissions that may be triggered by one or more of the downlink transmissions. Conventionally, transmission of information from a WD to a neighbouring WD would require uplink radio resources for a first transmission to the RAN node and downlink radio resources for a second transmission from the RAN node to the neighbouring WD. Using a sidelink transmission from a WD to a neighbouring WD has the advantage of requiring radio resources for only one transmission.

BRIEF DESCRIPTION OF THE FIGURES

Further features and advantages of the present invention will be apparent from the following detailed description, taken in combination with the appended drawings, in which:

FIG. 10A illustrates, in one embodiment, a method of operation performed in a WD for synchronising periodic wireless communications with a RAN node.

Throughout the appended drawings, like features are identified by like reference numerals.

DETAILED DESCRIPTION

Figure 1:
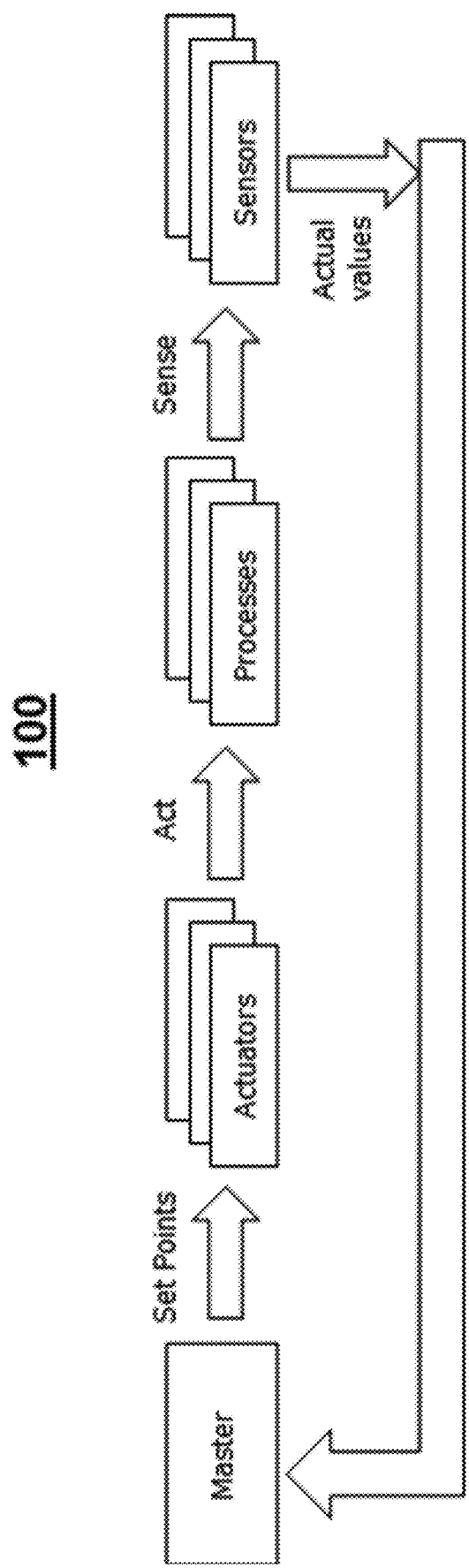
FIG. 1 illustrates, in one embodiment, a schematic representation of a closed-loop process control system.

Embodiments of the present invention provide advantages by way of allowing a RAN node to synchronise use of pre-configured radio resources with the arrival of user plane data. Embodiments herein avoid shortcomings associated with conventional configured scheduling where radio resources may be wasted if data is not available when a transmission opportunity occurs and where additional delays are incurred if data must be buffered until the next scheduled transmission opportunity. Embodiments herein also avoid shortcomings associated with dynamic scheduling which requires that a WD continually monitors transmissions on the physical downlink control channel (PDCCH) and where increased radio resources are required for PDCCH transmissions when data is being scheduled in short time intervals to reduce latency.

Among other advantages, use of a synchronised communications configuration with a downlink portion, an uplink portion and a sidelink portion provides a compact signalling mechanism that coordinates one or more downlink, uplink and sidelink transmissions that are triggered by the arrival of a downstream PDU.

Embodiments herein further provide mechanisms for synchronising periodic communications in a wireless system. In particular, mechanisms are described for synchronising pre-configured radio link transmissions over a wireless fieldbus link with the availability of data from a PLC-M and associated PLC-Ds. In embodiments, a WD may be provisioned with one or more synchronised communications configurations, where each synchronised communications configuration defines parameters and radio resources that may be used for downlink, uplink and sidelink transmissions by a WD associated with a wireless fieldbus segment of a process control system. The WD may store the synchronised communications configurations and activate a particular synchronised communications configuration when it receives a corresponding periodic communications synchronisation indicator (PCSI). In an embodiment, the activated synchronised communications configuration may be valid only for one process loop control (PLC) cycle, and a subsequent PCSI may be required to activate a synchronised communications configuration for a next PLC cycle. In an embodiment, the activated synchronised communications configuration may be valid for multiple PLC cycles, and a subsequent PCSI may be required to activate a different synchronised communications configuration. In an embodiment, a PCSI is transmitted by the RAN node in response to receiving a downstream PDU from the PLC-M, thereby synchronising the preconfigured downlink (DL), uplink (UL) and sidelink (SL) radio resource allocations with the arrival of user plane data.

Among other advantages provided by embodiments herein, each synchronised communications configuration identifies parameters and radio resources for one or more downlink transmissions that may be triggered by the arrival of a downstream PDU at the RAN node. A synchronised communications configuration may also identity parameters and radio resources for one or more uplink transmissions that may be triggered by one or more of the downlink transmissions. A synchronised communications configuration may also identity parameters and radio resources for one or more sidelink transmissions that may be triggered by one or more of the downlink transmissions. In some embodiments, when a WD detects transmission of a PCSI, it may activate the corresponding synchronised communications configuration at a pre-determined interval following receipt of the PCSI.

In some embodiments, the RAN node may transmit only one PCSI in each PLC cycle and the corresponding synchronised communications configuration may refer only to radio resources to be used by the first WD in a wireless fieldbus group. The radio resources to be used by another WD in the wireless fieldbus group may be based on an index provided to the WD by the RAN node. In other embodiments, each WD may be provided with its own set of synchronised communications configurations and the RAN node may transmit a PCSI to each WD in each PLC cycle or may transmit one or more PCSIs in each PLC cycle where each PCSI is associated with a group of WDs. In some embodiments, the RAN node may not transmit a PCSI if the previously indicated synchronised communications configuration can be reused in the current PLC cycle.

A WD is provisioned with one or more synchronised communications configurations where each synchronised communications configuration identifies parameters and radio resources for one or more downlink transmissions that may be triggered by the arrival of a downstream PDU at the RAN node. A synchronised communications configuration may also identity parameters and radio resources for one or more uplink transmissions that may be triggered by one or more of the downlink transmissions. A synchronised communications configuration may also identity parameters and radio resources for one or more sidelink transmissions that may be triggered by one or more of the downlink transmissions.

The WD stores the synchronised communications configurations and activates a particular synchronised communications configuration when it receives a corresponding PCSI. In some embodiments, the activated transmission schedule and configuration may be valid only for one PLC cycle and a subsequent PCSI may be required to activate a transmission configuration in the next PLC cycle.

In some embodiments, a PCSI may be a DCI transmitted using a PDCCH where the DCI includes an indication that a radio link transmission cycle has been started.

In some embodiments, a PCSI may be an unmodulated signal such as a Zadoff-Chu sequence (ZCS) or a Gold sequence. In some embodiments, a WD may incorporate a specialised receiver, such as a ZCS correlator, to enhance WD performance. Typically, the probability of successful reception of an unmodulated signal is higher than the probability of successful reception of a DCI.

In other embodiments, multiple PCSIs may be configured to convey additional information to the WDs of a wireless fieldbus segment. For example, the identity of the PCSI may be used as a reference to one of the pre-determined synchronised communications configurations, indicating the synchronised communications configuration that should be used in this PLC cycle.

In some embodiments, such as those where a ring topology is emulated in a wireless fieldbus segment, only one PCSI is required per cycle, indicating that a composite PLC PDU has been received from the PLC-M. The associated synchronised communications configuration identifies the parameters and radio resources for downlink, uplink and sidelink transmissions in the current cycle for all WDs in the fieldbus group.

In other embodiments, such as those where a virtual star topology is emulated in a wireless fieldbus segment, one PCSI may be required per cycle for each WD in the wireless fieldbus segment, indicating that a PLC PDU destined for that WD has been received from the PLC-M. The associated synchronised communications configuration identifies the parameters and radio resources for downlink and uplink transmissions in the current cycle only for the targeted WD.

With reference to FIG. 1, illustrated in one embodiment is a schematic representation of a closed-loop process control (PLC) system 100. This may be used, for example, in a motion control system that is responsible for controlling moving and/or rotating parts of machines in a well-defined manner (e.g. in printing machines, machine tools or packaging machines). A process loop control master node (PLC-M) periodically sends desired set points to one or several actuators (e.g. a linear actuator or a servo drive) which then perform a corresponding action on one or several processes (e.g. a movement or rotation of a certain component). At the same time, sensors determine the current state of the processes (e.g. the current position and/or rotation of one or multiple components) and send the actual values back to the PLC-M. This is done in a strictly cyclic and deterministic manner, such that during one communication cycle time ($T_{CYCLE}$) the PLC-M sends updated set points to all actuators, and all sensors send their actual values back to the PLC-M. For example, a PLC system requiring motion control and coordination may have cycle times in the order of 500 μsec.

In some embodiments, each process loop control device (PLC-D) in the PLC system 100 includes a set of actuators, processes and associated sensors (e.g. a machine tool sets target position and speed via on-board actuators, local servo drives move the machine according to the targets, and on-board sensors detect the actual position and speed at the end of the cycle period). In other embodiments, different components may be included in different PLC-Ds of the PLC system 100 (e.g. actuators and servos may be in one PLC-D and sensors may be in a different PLC-D).

Figure 2:
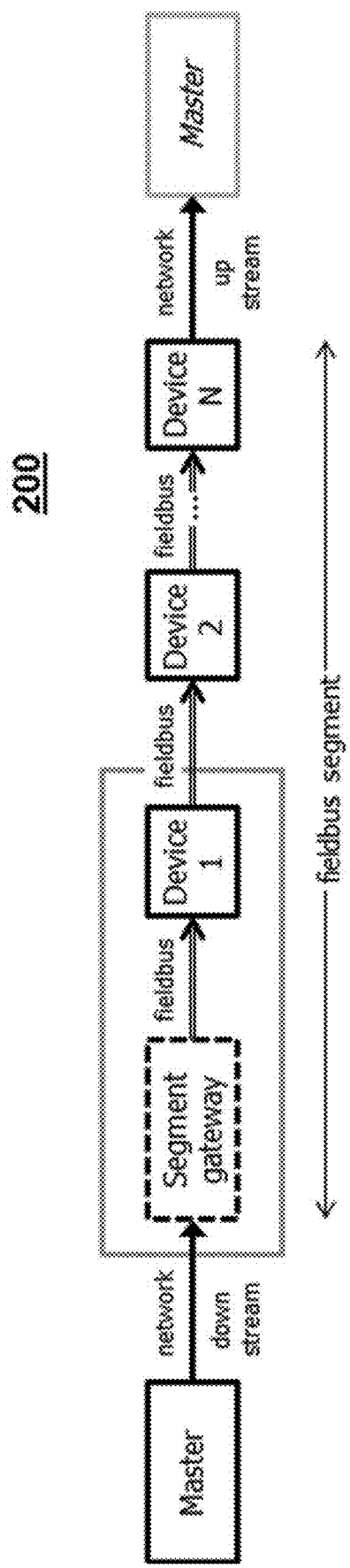
FIG. 2 illustrates, in one embodiment, PLC devices in a fieldbus segment chained together in a multi-drop line or ring topology.

FIG. 2 illustrates, in one embodiment, PLC devices in a fieldbus segment 200 chained together in a multi-drop line or ring topology.

In a PLC system such as described in FIG. 1, process control commands are sent in a downstream transmission from a PLC-M to one or more PLC-Ds in a fieldbus segment and the results from processing those commands at each PLC-D are returned to the PLC-M in an upstream transmission.

A PLC-M is connected to a fieldbus segment by a network link. In an industrial Ethernet deployment, the network link is typically an Ethernet link which may include switches, bridges and/or routers between the PLC-M and the first (and last) PLC-D in the segment. One network link is used for delivering downstream traffic to a fieldbus segment and the same or a different network link may be used for returning upstream traffic to the PLC-M.

In some deployments, the PLC devices in a fieldbus segment may be chained together in a multi-drop line or ring topology as illustrated in FIG. 2. In these topologies, each PLC-D may be connected to the next (downstream) PLC-D by a fieldbus link. In an industrial Ethernet deployment, a fieldbus link is typically a point-to-point Ethernet link with no intervening switches, bridges or routers. Each PLC PDU received from the PLC-M contains commands destined for one or more PLC devices in the fieldbus segment. Within the fieldbus segment, a downstream PLC PDU (PLC-M to fieldbus segment) is processed by a PLC-D and then relayed to the next PLC-D in the fieldbus segment; the ordering is determined by the physical cabling between devices—i.e. a PLC PDU is simply relayed from an input fieldbus link to an output fieldbus link. In some scenarios, a PLC-D can directly send information to a downstream PLC-D.

A segment gateway may be used to bridge the network links to the fieldbus links. In some deployments, the segment gateway function may be incorporated into the first (and last) PLC-D of the fieldbus segment. The segment gateway may be responsible for converting a downstream PDU (PLC-M to fieldbus segment gateway) into an upstream PDU (fieldbus segment gateway to PLC-M) by swapping the source and destination address fields received in the downstream Ethernet frame and/or IP packet that encapsulates a PLC PDU.

Figure 3B:
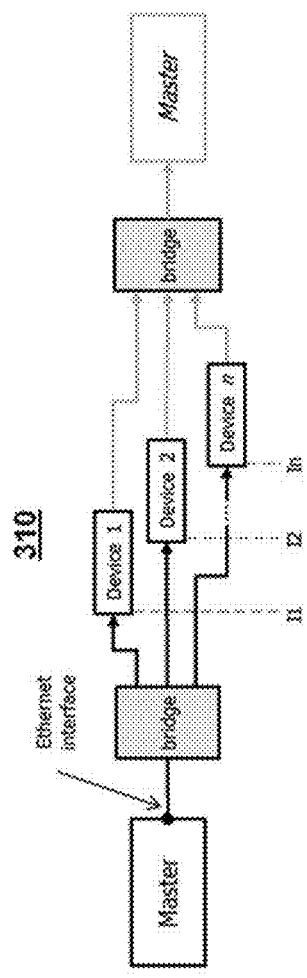
FIG. 3B illustrates, in one embodiment, a PLC network including PLC devices arranged in a virtual star topology.
Figure 3A:
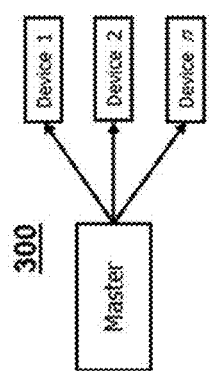
FIG. 3A illustrates, in one embodiment, a PLC network including PLC devices arranged in a star topology.

FIGS. 3A, 3B illustrates a PLC network 300 including PLC-Ds arranged in a star (FIG. 3A) topology and a PLC network 310 including PLD-Ds arranged in a virtual star (FIG. 3B) topology. In the PLC network 300 shown in FIG. 3A in which the PLC-Ds are arranged in a star topology, each downstream PLC PDU transmitted by the PLC-M includes commands intended for a single PLC-D.

In order to reduce costs, the PLD-s in the PLC network 310 illustrated in FIG. 3B are arranged in a virtual star topology which allows the PLC-M to use a single Ethernet interface for communicating with multiple PLC-Ds. An intermediate transparent bridge or switch directs the Ethernet frame containing a PLC PDU to the PLC-D corresponding to the destination address in the frame. Transmission of Ethernet frames is serialised through the PLC-M Ethernet interface so that a frame destined for a particular PLC-D arrives at the PLC-D (and at the bridge) offset in time according to the position of the PLC-D in the transmission cycle and the link occupancy time of the preceding Ethernet frames. For example, in the virtual star topology 310 illustrated in FIG. 3B, the arrival time of an Ethernet frame at the input port of PLC-D 2 ($I_2$) relative to the arrival time of an Ethernet frame at the input port of PLC-D 1 ($I_1$) is $I_2 > I_1$.

Figure 4:
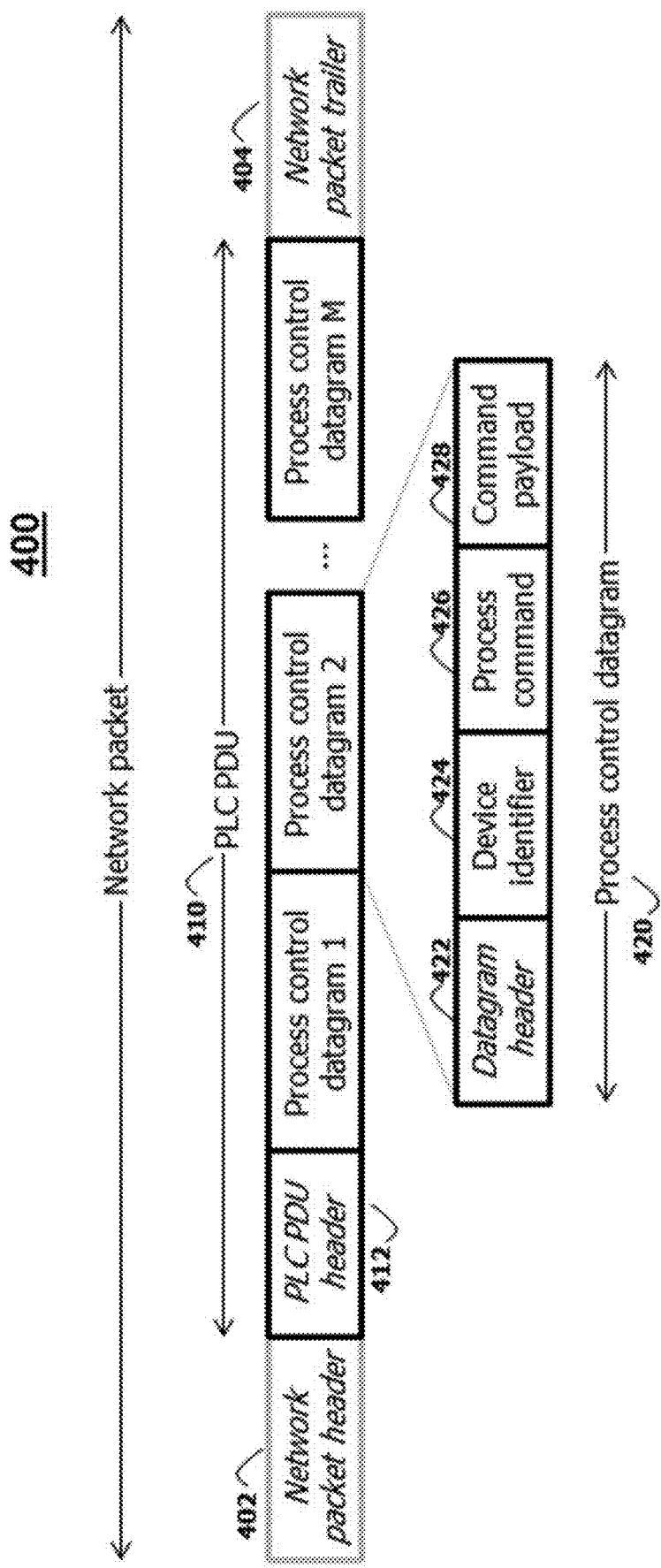
FIG. 4 illustrates, in one embodiment, a network packet containing a PLC PDU.

FIG. 4 illustrates, in one embodiment, a PLC protocol data unit (PDU) encapsulated in a network packet 400. In a PLC system as described above, a downstream PLC PDU is transmitted periodically by the PLC-M where the isochronous interval between downstream PLC PDUs defines the cycle time ($T_{CYCLE}$). The responses resulting from processing those commands at each PLC-D are then returned to the PLC-M in an upstream transmission of a PLC PDU.

In the embodiment illustrated in FIG. 4, the PLC PDU 410 from the PLC-M includes M process control datagrams 420 for reading information from and/or writing information to N PLC devices; a PLC PDU including datagrams destined for multiple devices is known as a composite PLC PDU.

A process control datagram 420 comprises a command 426 and a payload 428 including information associated with the command 426 (e.g. for write commands, information sent to an actuator associated with a PLC-D; for read commands, (space for) information received from a sensor associated with a PLC-D). The process control datagram 420 also includes an identifier 424 for the PLC device or devices that are expected to process the command 426—i.e. application-specific identifiers in a datagram 420 identify the targeted PLC devices.

In a line or ring topology, PLC PDUs are relayed from one PLC-D to the next PLC-D within the fieldbus segment; a PDU is relayed through a PLC-D even if the PDU includes no datagrams for processing by the PLC-D. In a line or ring topology, multiple devices may process a particular command, providing a form of multicast addressing.

Information read from a sensor associated with a PLC-D may be added to the process control datagram 420 before the PLC PDU 410 is forwarded; control and status information may also be added to a process control datagram 420 by a PLC-D. The resulting PLC PDU 410 is forwarded back to the PLC-M—i.e. the PLC-M sends one PLC PDU containing one or more commands and receives one PLC PDU containing the responses to the commands (e.g. updated sensor and/or status information).

A network packet 400 (e.g. Ethernet frame and/or IP/UDP packet) may be used to encapsulate and convey the PLC PDU 410 between the PLC-M and the fieldbus segment and between PLC-Ds within the segment; in some deployments, addressing information contained the network packet header 402 is ignored by a PLC-D (i.e. packets are simply relayed from an input fieldbus link to an output fieldbus link).

Figure 5:
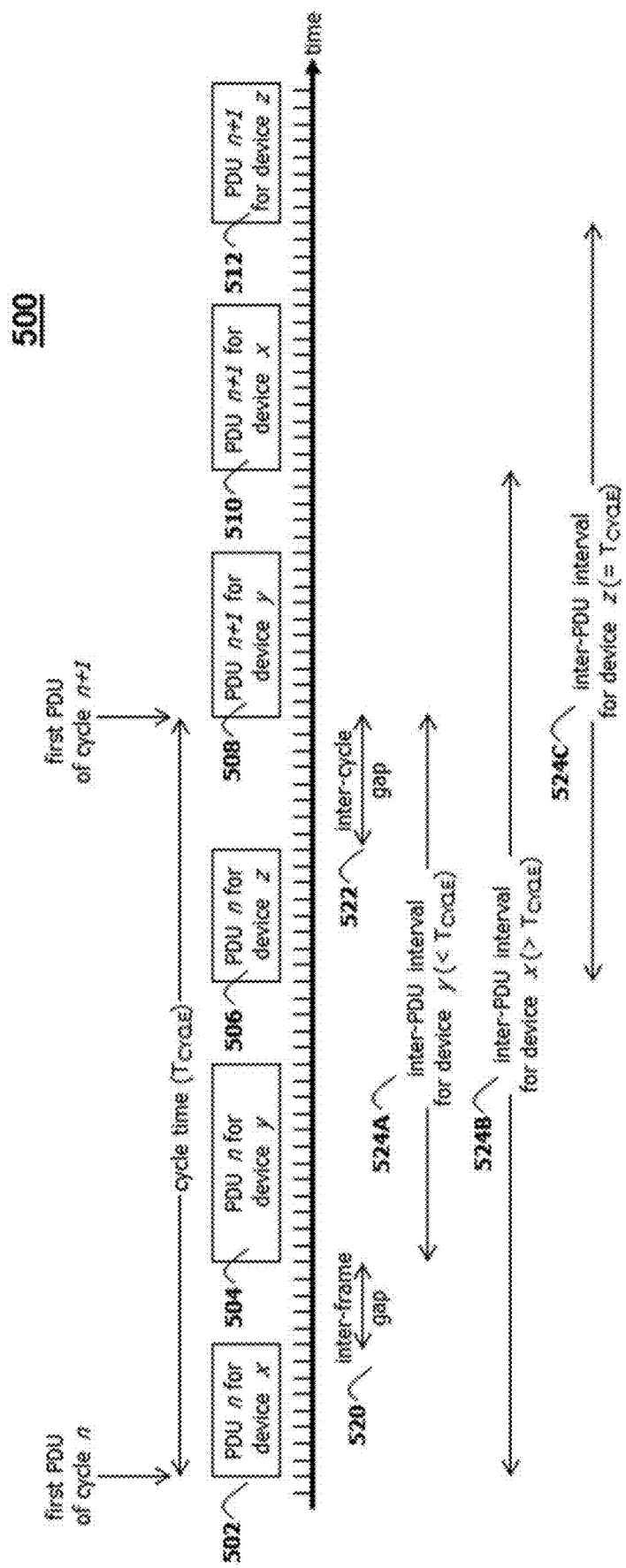
FIG. 5 illustrates, in one embodiment, aspects of periodic communications in a process control system configured in a virtual star topology.

FIG. 5 illustrates, in one embodiment, aspects of periodic communications in a process control system 500 configured in a virtual star topology, including cycle time and inter-PDU arrival time. During one communication cycle time ($T_{CYCLE}$), the PLC-M sends updated set points to all actuators and instructs all sensors to send their current values back to the PLC-M. The duration of the cycle ($T_{CYCLE}$) is a fixed value that is determined by the process requirements. However the time between successive PLC PDUs arriving at a particular PLC-D may change depending on the logic and processing load in the PLC-M and on the degree of congestion in the network between the PLC-M and PLC-D.

For example, as illustrated in the particular virtual star topology of FIG. 5:
- the cycle time $T_{CYCLE}$ typically reflects the interval between the reception start time of the first Ethernet frame in one process cycle (e.g. 502 in cycle n) and the reception start time of the first Ethernet frame in the next process cycle (i.e. 508 in cycle n+1).
- depending on PLC-M logic, the order of PLC PDU transmissions in one cycle (e.g. for devices [x, y, z] in cycle n) may be different from the order of PLC PDU transmissions in another cycle (e.g. for devices [y, x, z] in cycle n+1).
- depending on the number of commands (datagrams) being sent by the PLC-M to a PLC-D in a cycle, the length of the PLC PDU transmitted to a particular PLC-D may change from one cycle to another (e.g. 510, PDU n+1 for PLC-D x in cycle n+1, is larger than 502, PDU n for PLC-D x in cycle n).
- the time between ending reception of one Ethernet frame and starting reception of the next Ethernet frame (i.e. the inter-frame gap 520) may be variable.
- the time between ending reception of last Ethernet frame in one cycle and starting reception of the first Ethernet frame in the next cycle (i.e. the inter-cycle gap 522) may be variable.

As a result, the time between successive PDUs destined for a PLC-D (i.e. the inter-PDU interval for a PLC-D) may be variable. For example, in FIG. 5, the inter-PDU interval for PLC-D z (the interval 524C between PDU 506 and PDU 512) is equal to the cycle time $T_{CYCLE}$, the inter-PDU interval for PLC-D x (the interval 524B between PDU 502 and PDU 510) is greater than $T_{CYCLE}$, and the inter-PDU interval for PLC-D y (the interval 524A between PDU 504 and PDU 508) is less than $T_{CYCLE}$.

A PLC system utilising wireless fieldbus links typifies the problem of synchronising periodic communications in a wireless system. A RAN node in a wireless system typically uses configured scheduling to deal with the problem of synchronising periodic transmissions with WDs. With configured scheduling, radio resources for a sequence of uplink or downlink transmissions are allocated to a WD at a fixed, pre-determined interval. However, utilizing configured scheduling for dealing with periodic PLC PDU transmissions when a PLC-D is connected to a fieldbus segment through a wireless link would ignore the fact that there may be jitter in the inter-PDU interval because configured scheduling assumes that the inter-PDU interval is fixed. If a downstream PLC PDU sent by a PLC-M is not available at the RAN node before the starting symbol of the configured transmission time, the PLC PDU may be deemed "lost" which may result in a critical process failure in the PLC system. Further, if a downstream PLC PDU is not available before the starting symbol of the configured transmission time, the radio resources allocated for that transmission may be wasted since they cannot be used for another WD where data may be available. This impacts the efficiency of radio resource usage and may impact the performance of a WD that is prevented from using the radio resources.

Dynamic scheduling is conventionally used by a RAN node in a wireless system to deal with the uncertain arrival of DL and UL traffic. Dynamic resource scheduling incurs signalling delays between the scheduling of radio resources and the actual transmission of data; additional delays may be incurred for acknowledgment signalling and, if necessary, for scheduling and acknowledgment of retransmissions to recover from transmissions errors. However, for short PLC cycle times, the delays associated with scheduling before transmission may be unacceptable or may require special capabilities in a WD.

Dynamic scheduling also implies that a WD is continually monitoring transmissions on the PDCCH in order to detect a DCI addressed to the WD. This requires blind detection involving multiple candidate DCIs which may impact the performance and battery use on the WD. In addition, transmission of DCIs using PDCCH is subject to transmission errors, further reducing the reliability of communications. The increased radio resources required for PDDCH transmissions may impact the availability of radio resources needed for transmitting user and control plane data, especially when data is being scheduled in short time intervals to reduce latency.

Therefore, there is a need for a mechanism to synchronise transmission times in a configured schedule with the actual arrival of downstream PDUs.

Figure 6:
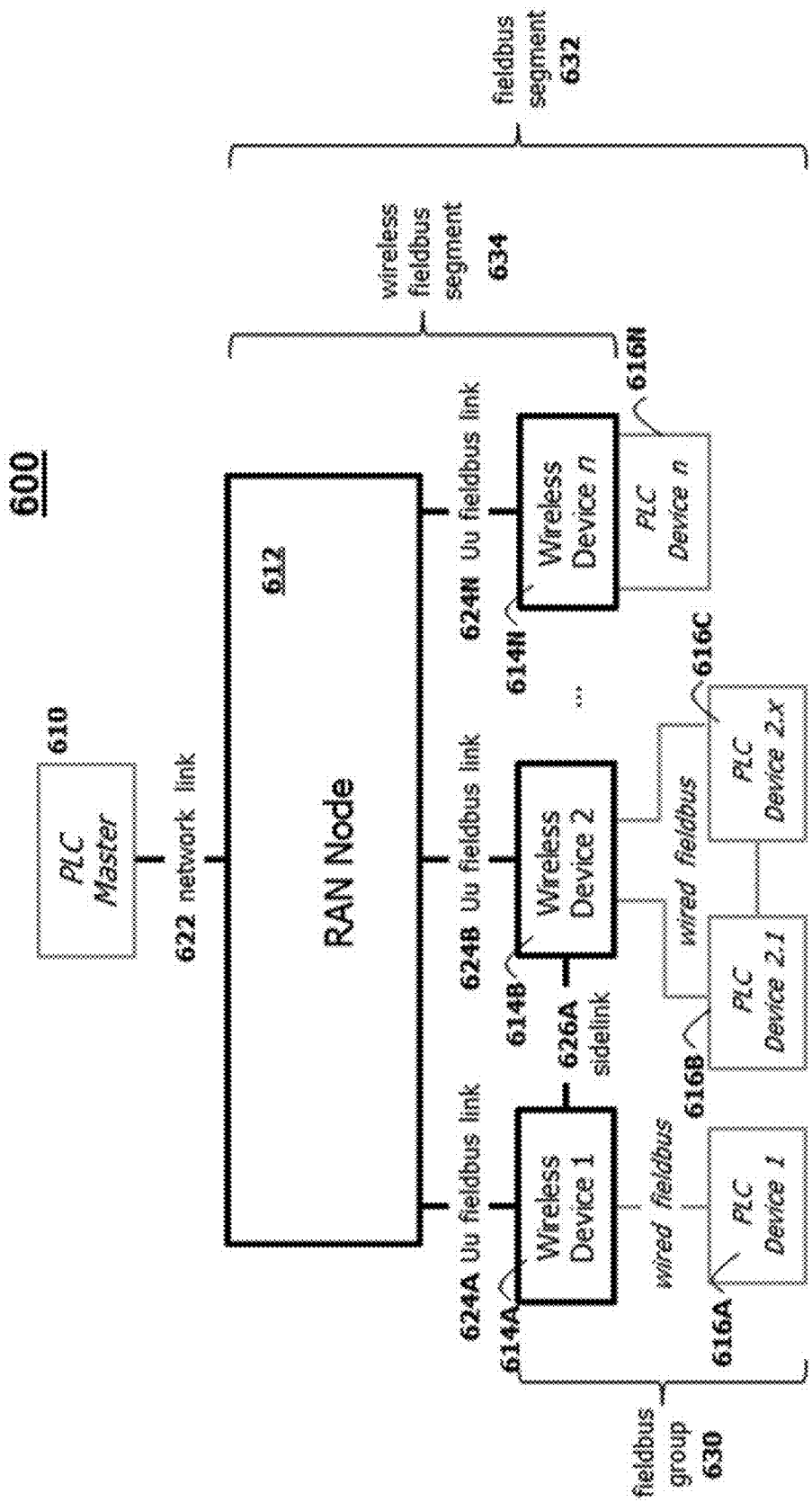
FIG. 6 illustrates, in one embodiment, a PLC network including wireless fieldbus links.

FIG. 6 illustrates, in an embodiment, a PLC network 600 including wireless fieldbus links. A RAN node 612 functions as a fieldbus segment gateway for one or more fieldbus segments 632. The RAN node 612 is connected to a PLC-M 610 via a network link 622 and provides communications over wireless fieldbus links 624A, 624B, . . . 624N (generally referred to as wireless fieldbus link 624 and collectively as wireless fieldbus links 624) to PLC-Ds 616A, 616B, 616C, ..., 616N (generally referred to as PLC-D 616 and collectively as PLC-Ds 616) that are associated with the PLC-M 610.

WDs 614A, 616B, ..., 616N (generally referred to a WD 614 and collective as WDs 614) bridge communications between the RAN node 612 and the PLC-Ds 616. In some deployments, WD functionality may be incorporated into a PLC-D (e.g. WD 614N incorporating PLC-D 616N). In other deployments, a WD may include a local (wired) fieldbus interface with one or more PLC-Ds attached to that local fieldbus (e.g. WD 614B with fieldbus interface to PLC-D 616B). A WD 614 communicates with the RAN node 612 via a wireless fieldbus link 624 that may, for example, be based on the 3GPP New Radio (NR) or LTE Uu interface. A WD may also communicate directly with a neighbouring WD using a wireless sidelink if there is no obstruction between the WDs that would block the radio transmission. For example, in FIG. 6, WD 614A may communicate directly with WD 614B via sidelink 626A. A wireless sidelink may, for example, be based on the 3GPP New Radio (NR) or LTE Uu interface.

A network link 622 conveys PLC PDUs between the PLC-M 610 and the RAN node 612. Each PLC PDU may be encapsulated in an Ethernet frame and/or IP/UDP packet for transport over the network link. Zero, one or more bridges, switches or routers may be deployed in the network between the PLC-M and the RAN node. In some deployments, the network link 622 may embody an N2/N3 interface to a CN.

The WDs 614 associated with a particular PLC-M 610 constitute a fieldbus group 630 within the context of the RAN node 612. A RAN node, such as RAN node 612, may function as a fieldbus segment gateway for multiple fieldbus groups (not shown). The operations of the RAN node 612 and the WDs 614 are transparent to the PLC master 610 and to the PLC devices 616—i.e. the PLC-M 610 and the PLC-Ds 616 are expected to be conventional PLC products.

At some point in time, each WD 614 is provisioned with one or more synchronised communications configurations where each synchronised communications configuration defines parameters and radio resources that may be used to govern downlink, uplink and sidelink transmissions associated with periodic communications over a wireless link. A synchronised communications configuration may be conveyed from the RAN node 612 to a WD 614 via the control plane using, for example, radio resource control (RRC) signalling.

Typically, a synchronised communications configuration identifies parameters and radio resources for one or more downlink transmissions that may be triggered by the arrival of a downstream PDU at a RAN node, such as RAN node 612. A synchronised communications configuration may also identity parameters and radio resources for one or more uplink transmissions and for zero or more sidelink transmissions that may be triggered by one or more of the downlink transmissions. For example, a downstream PDU received by the RAN node may presage the arrival of subsequent downstream PDUs; a single synchronised communications configuration may identify the downlink radio resources to be used for transmission of the first and subsequent downstream PDUs. Similarly, a downstream PDU received by the RAN node may presage the arrival of subsequent upstream PDUs from a WD, such as WD 614; a single synchronised communications configuration may identify the downlink radio resources to be used for transmission of the downstream PDU and the uplink radio resources to be used for transmission of the subsequent upstream PDU.

Each synchronised communications configuration defines parameters and radio resources that may be used for downlink transmissions over the radio link (a downlink portion), parameters and radio resources that may be used for uplink transmissions over the radio link (an uplink portion), and parameters and radio resources that may be used for sidelink transmissions over the radio link (a sidelink portion). The downlink portion, the uplink portion and the sidelink portion may include one or more of:

- an initial time domain resource allocation (e.g. sub-frame offset, start symbol and number of symbols);
- an initial frequency domain resource allocation (e.g. starting resource block and number of resource blocks);
- the modulation and coding scheme;
- demodulation reference signals;
- the number of transmission repetitions;
- the time interval between initial and repeated transmissions, if time domain diversity is used;
- the frequency offset between initial and repeated transmissions, if frequency domain diversity is used;
- the redundancy version (RV) sequence to use for repetitions (i.e., repeated transmissions);
- frequency hopping configuration for repeated transmissions;
- a time domain interval for subsequent resource allocations, including number of nanoseconds, number of symbols, number of slots and number of sub-frames; and
- a frequency domain interval for subsequent resource allocations, including a number of resource blocks, bandwidth part identifier, and component carrier identifier.

In addition, a WD may be provisioned by the RAN node with an index used to uniquely identify the WD within the fieldbus group. The index may be used by a WD to identify the radio resources that have been assigned to the WD in a sidelink portion, an uplink portion and/or a downlink portion. A WD stores the synchronised communications configurations and activates a particular synchronised communications configuration only when it receives a corresponding PCSI from the RAN node.

In some embodiments, a PCSI is an unmodulated signal such as a Zadoff-Chu sequence (ZCS) or a Gold sequence. Each synchronised communications configuration may be associated with an unmodulated periodic communications synchronisation signal (PCSS) so that detection of the PCSS by a WD causes the corresponding synchronised communications configuration to be used to govern downlink, uplink and sidelink transmissions for the PLC cycle. The configuration of a PCSS may include:

- A1. time domain monitoring occasions (e.g. sub-frame offset, start symbol, number of symbols, interval between monitoring occasions);
- A2. frequency domain resource allocation (e.g. starting resource block);
- A3. the parameters of the signal generating sequence (e.g. length, base sequence, cyclic shift);
- A4. the time interval between detection of the PCSS and activation of the corresponding synchronised communications configuration; this may, for example, be expressed in terms of absolute time (e.g. number of nanoseconds), in terms of radio channel configuration (e.g. number of symbols) or in terms of radio frame configuration (e.g. slot or sub-frame number).

At each time domain monitoring occasion (A1), a WD attempts to detect transmission of the indicated PCSS (A3) in the specified frequency domain resources (A2). Multiple orthogonal PCS signals, representing different synchronised communications configurations, may be configured to use the same set of time and frequency radio resources. This may be used, for example, in an emulated virtual star topology where the RAN node may simultaneously transmit multiple PCS signals, one for each of the WDs that is associated with a downstream PLC PDU received by the RAN node.

Figure 7:
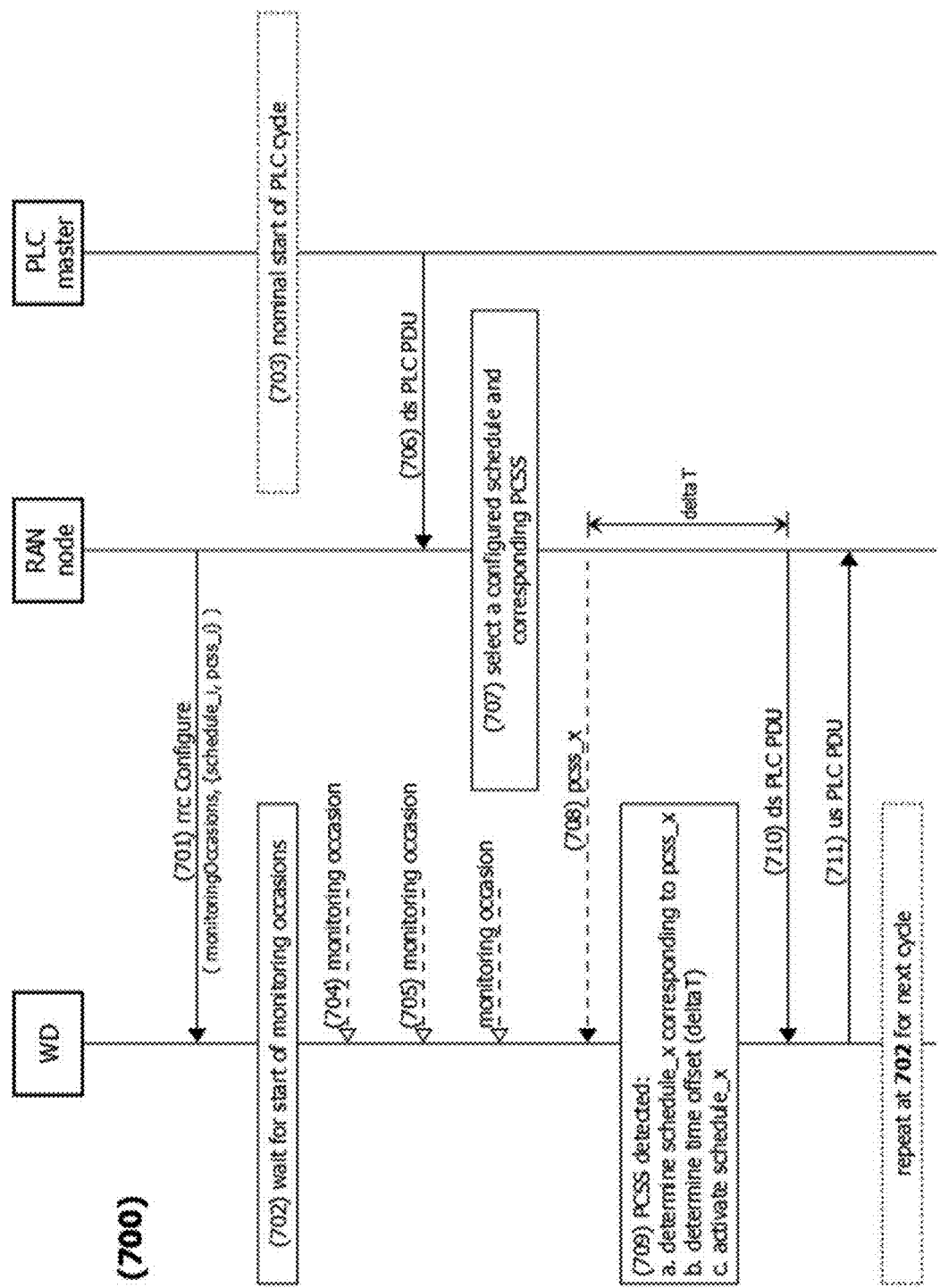
FIG. 7 illustrates, in one embodiment, a method of activating a synchronised communication configuration for downlink, uplink and sidelink PDU transmissions based on a periodic communications synchronisation indicator (PCSI) received at a WD.

FIG. 7 illustrates, in one embodiment, a method of activating a synchronised communication configuration for downlink, uplink and sidelink transmissions based on a PCSS received at a WD, such as WD 614. If a PCSS is detected, the WD activates the corresponding synchronised communication configuration for downlink, uplink and sidelink transmissions with the first time domain resource of the configuration (e.g. the first symbol) synchronised to the PCSS according to the configured time offset (A4). As illustrated in FIG. 7:

At operation 701, a RAN node, such as RAN node 612, provisions a WD with a set of one or more synchronised communications configurations and the identity of the PCSS corresponding to each configuration. The RAN node also provisions the WD with an indication of when to monitor the downlink channel for possible PCSS transmissions.

At operation 702, the WD then waits for the start of PCSS monitoring occasions, as provisioned by the RAN node.

The start of PCSS monitoring occasions corresponds to the nominal start of a PLC cycle (703).

At operation 704, at a provisioned monitoring occasion, the WD looks for a transmission of a configured PCSS. If the WD has been provisioned with multiple synchronised communications configurations, the WD may look for the transmission of multiple PCS signals at each monitoring occasion.

If the WD does not detect a PCSS, it waits until the next monitoring occasion (705) before looking for a transmission of a configured PCSS.

At operation 706, at some point in time, the PLC-M transmits a downstream PLC PDU to the RAN node, indicating the start of the next PLC cycle.

At operation 707, when the RAN node receives the downstream PLC PDU, it determines a suitable synchronised communications configuration that defines radio resources to be used by one or more WDs of the fieldbus group for downlink, uplink and sidelink transmissions in the current PLC cycle. For example, selection of a suitable synchronised communications configuration may be based on one or more of the following:
  a destination address in a downstream PDU;
  type of downstream PDU;
  size of downstream PDU;
  number of downstream PDUs buffered at the RAN node;
  timing of PDU reception relative to radio link frame structure and time division duplex (TDD) configuration;
  radio resources available when a downstream PDU is received.

At operation 708, at the next monitoring occasion, the RAN node transmits the PCSS corresponding to the selected synchronised communications configuration to one or more WDs of the fieldbus group.

At operation 709, when the WD detects the PCSS, it determines the corresponding synchronised communications configuration and, at a pre-determined time offset from transmission of the PCSS ("deltaT"), activates that configuration. The time offset may be determined, for example, from a configuration parameter provided by the RAN node, from a capability associated with the WD or from a radio link attribute such as a TDD pattern or radio link frame structure.

At operation 710, at the pre-determined time offset from transmission of the PCSS ("deltaT"), the RAN node transmits the PLC PDU to the WD using the downlink radio resources indicated in the downlink portion of the selected synchronised communications configuration.

Subsequent downstream PLC PDUs (if any) received from the PLC-M in the current PLC cycle are transmitted to the WD according to the downlink radio resource allocations described by the downlink portion of the selected synchronised communications configuration.

At operation 711, similarly, subsequent upstream PLC PDUs are transmitted by the WD according to the uplink radio resource allocations described by the uplink portion of the selected synchronised communications configuration.

When transmission of all upstream PLC PDUs has been completed for the current PLC cycle, the WD waits for the start of monitoring occasions (at operation 702) for the next PLC cycle. Sidestream PLC PDUs may also be received and/or transmitted by the WD in each cycle according to the sidelink radio resource allocations described by the sidelink portion of the selected synchronised communications configuration.

Figure 8:
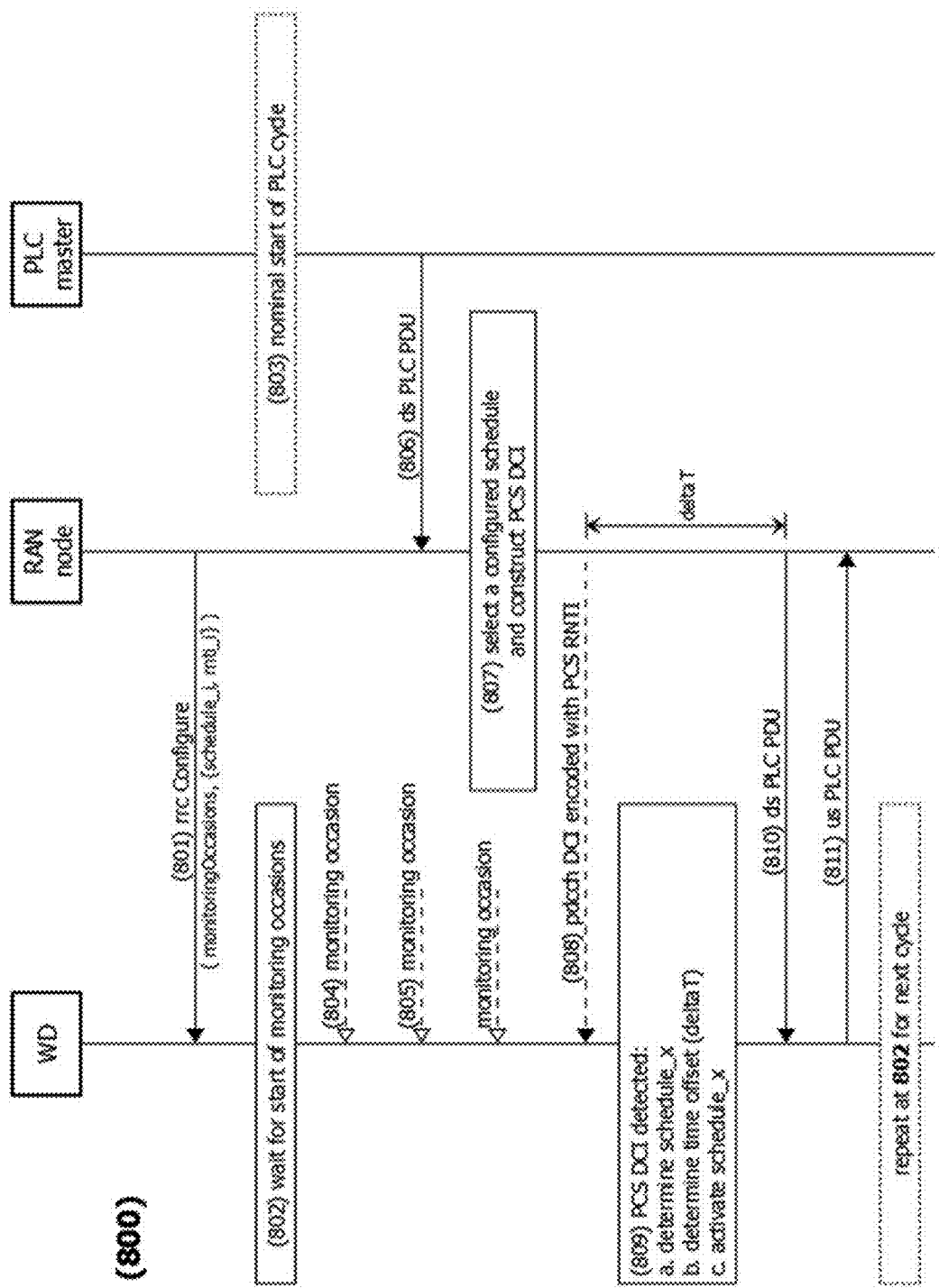
FIG. 8 illustrates, in one embodiment, a method of activating a synchronised communication configuration for downlink, uplink and sidelink PDU transmissions where the PCSI comprises a downlink control information (DCI) message.

FIG. 8 illustrates, in one embodiment, a method of activating a synchronised communication configuration for downlink, uplink and sidelink transmissions where the PCSI comprises a downlink control information (DCI) message encoded with a particular radio network temporary identifier (RNTI) when transmitted over a physical downlink control channel (PDCCH). The periodic communications synchronisation (PCS) DCI used as a PCSI may be one of the following variants:

B1. in this embodiment, the PCS DCI is a conventional data DCI, encoded with a WD-specific resource allocation RNTI (e.g. cell RNTI, C-RNTI), that may include a periodic communications synchronisation indicator.

B2. in this embodiment, the PCS DCI is a conventional NR Type 2 configured schedule activation DCI, encoded with a WD-specific configured scheduling RNTI (e.g. CS-RNTI).

B3. in this embodiment, the PCS DCI is a new type of DCI encoded with a WD-specific periodic communications synchronisation RNTI (e.g. PCS-RNTI).

B4. in this embodiment, the PCS DCI is a new type of DCI encoded with a group periodic communications synchronisation RNTI (e.g. PCSG-RNTI) indicating the start of a PLC cycle to a group of one or more WDs.

B5. in this embodiment, the PCS DCI is a new type of DCI encoded with a group periodic communications synchronisation RNTI (e.g. PCSG-RNTI) that contains an indicator for each of the WDs in the group. For example, the PCS DCI may contain a bit map where each bit is associated with a particular WD; if a bit corresponding to a WD is set (e.g. to '1'), it indicates that the PSCI applies to that WD.

In some embodiments, information in the DCI is used to identify the synchronised communications configuration that the WD should use; in the following descriptions, the RNTIs used to encode these DCIs are referred to as Type R1 RNTIs. Information in a DCI encoded with a Type R1 RNTI may include:

C1. the identity of the synchronised communications configuration that is being activated.

C2. the time interval between detection of the PCS DCI and activation of the corresponding synchronised communications configuration; this may, for example, be expressed in terms of absolute time (e.g. number of nanoseconds), in terms of radio channel configuration (e.g. number of symbols) or in terms of radio frame configuration (e.g. slot or sub-frame number).

In some embodiments, different RNTIs may be associated with different synchronised communications configurations; in the following descriptions, these are referred to as Type R2 RNTIs. In these embodiments, the Type R2 RNTI and corresponding DCI parameters (C1 and C2) may be provisioned into a WD by the RAN node using, for example, RRC signalling.

The RAN node may also provision a WD with time domain monitoring occasions (C3) to indicate when the WD should monitor a PDCCH for transmissions of a PCS DCI. At each time domain monitoring occasion (C3), a WD attempts to detect transmission in a PDCCH of a DCI encoded with a provisioned RNTI (i.e. one or more of B1-B5). If a PCS DCI associated with the WD is detected, the WD activates the corresponding synchronised communications configuration for downlink, uplink and sidelink transmissions (C1) with the first time domain resource of the configuration (e.g. the first symbol) synchronised to the PDCCH containing the PCS DCI according to the configured time offset (C2). As illustrated in FIG. 8:

At operation 801, a RAN node, such as RAN node 612, provisions a WD, such as WD 614, with a set of one or more synchronised communications configurations and the identity of a PCS RNTI that will be used to activate the configuration; this may be a Type R1 or Type R2 RNTI. The RAN node also provisions the WD with an indication of when to monitor the PDCCH for possible PCSI transmissions.

At operation 802, the WD then waits for the start of PDCCH monitoring occasions, as provisioned by the RAN node. The start of PDCCH monitoring occasions corresponds to the nominal start of a PLC cycle (803).

At operation 804, at a provisioned monitoring occasion, the WD looks for a transmission of a DCI encoded with a provisioned PCS RNTI. If the WD has been provisioned with multiple RNTIs, the WD may look for the transmission of multiple DCIs at each monitoring occasion.

If the WD does not detect a DCI encoded with a provisioned PCS RNTI, it waits until the next monitoring occasion (805) before looking for a transmission of a PCS DCI.

At operation 806, at some point in time, the PLC-M transmits a downstream PLC PDU to the RAN node, indicating the start of the next PLC cycle.

At operation 807, when the RAN node receives the downstream PLC PDU, it determines a suitable synchronised communications configuration that defines radio resources to be used by one or more WDs of the fieldbus group for downlink, uplink and sidelink transmissions in the current PLC cycle.

At operation 808, at the next monitoring occasion, the RAN node constructs a PCS DCI and transmits the DCI to one or more WDs of the fieldbus group encoded with a provisioned PCS RNTI.

At operation 809, when the WD detects the DCI encoded with a provisioned PCS RNTI, it determines the corresponding synchronised communications configuration and, at a pre-determined time offset from transmission of the PCS DCI ("deltaT"), activates that configuration. The time offset may be included in the PCS DCI or may be determined, for example, from a configuration parameter provided by the RAN node, from a capability associated with the WD or from a radio link attribute such as a TDD pattern or radio link frame structure At operation 810, at the pre-determined time offset from transmission of the PCS DCI ("deltaT"), the RAN node transmits the PLC PDU to the WD using the downlink radio resources indicated in the downlink portion of the selected synchronised communications configuration.

Subsequent downstream PLC PDUs (if any) received from the PLC-M in the current PLC cycle are transmitted to the WD according to the downlink radio resource allocations described by the downlink portion of the selected synchronised communications configuration.

At operation 811, similarly, subsequent upstream PLC PDUs are transmitted by the WD according to the uplink radio resource allocations described by the uplink portion of the selected synchronised communications configuration.

When transmission of all upstream PLC PDUs has been completed for the current PLC cycle, the WD waits for the start of monitoring occasions (at operation 802) for the next PLC cycle. Sidestream PLC PDUs may also be received and/or transmitted by the WD in each cycle according to the sidelink radio resource allocations described by the sidelink portion of the selected synchronised communications configuration.

Figure 9:
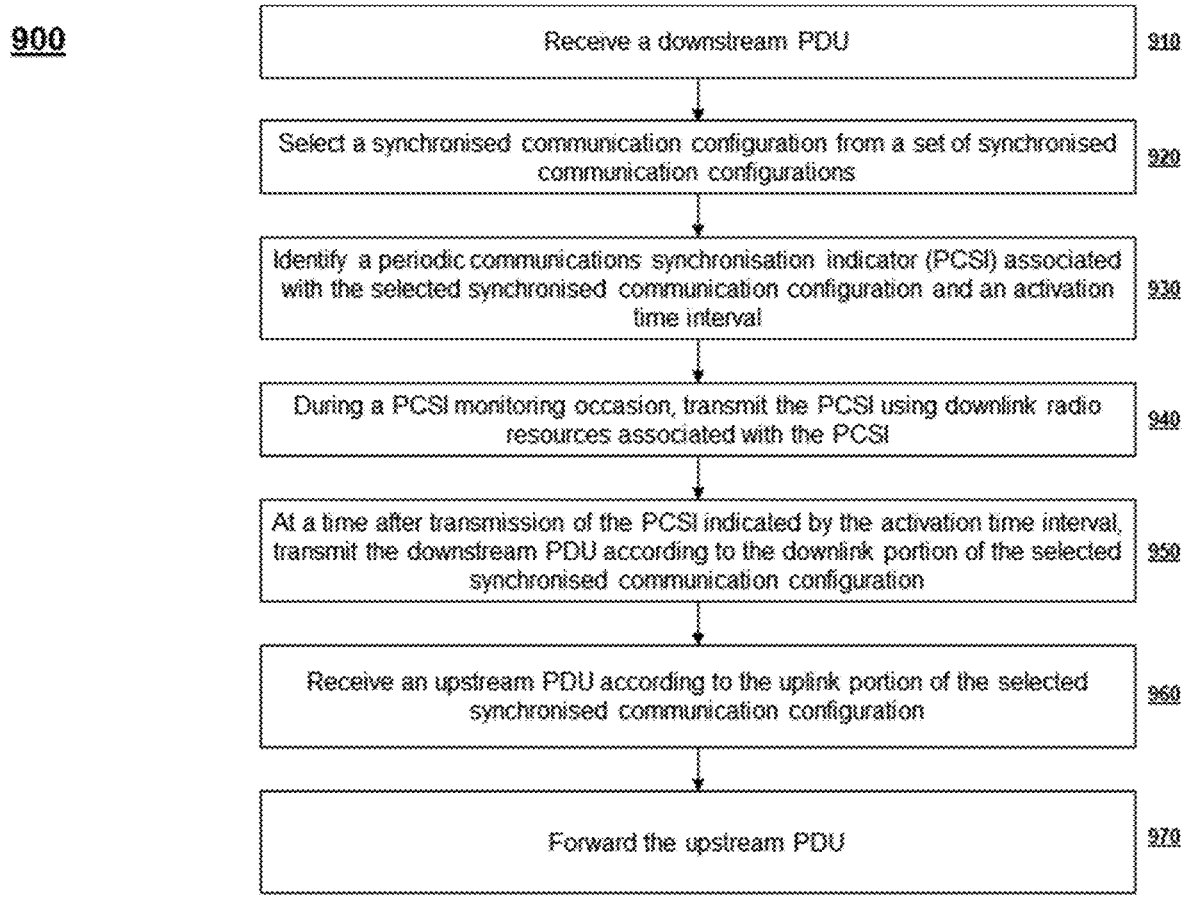
FIG. 9 illustrates, in one embodiment, a method of operation performed in a RAN node for synchronising periodic wireless communications with a WD.

FIG. 9 illustrates, in one embodiment, a method 900 performed at a RAN node, such as RAN node 612, for synchronising communications with a WD, such as WD 614 using a provisioned set of synchronised communication configurations and PCSI monitoring occasions.

At operation 910, the RAN node receives a downstream PDU.

At operation 920, the RAN node selects a synchronised communication configuration from the set of synchronised communication configurations where each synchronised communication configuration includes a downlink portion for downlink data transmissions and an uplink portion for uplink data transmissions to be used by one or more WDs of the fieldbus group.

At operation 930, the RAN node identifies a periodic communications synchronisation indicator (PCSI) associated with the selected synchronised communication configuration and an activation time interval.

At operation 940, during a PCSI monitoring occasion, the RAN node transmits the PCSI to one or more WDs of the fieldbus group using downlink radio resources associated with the PCSI.

At operation 950, at a time following transmission of the PCSI indicated by the activation time interval, the RAN node transmits the received PDU in accordance with the downlink portion of the selected synchronised communication configuration.

At operation 960, the RAN node receives an upstream PDU in accordance with the uplink portion of the selected synchronised communication configuration. In some embodiments, the RAN node receives multiple upstream PDUs in accordance with the uplink portion of the selected synchronised communication configuration.

At operation 970, the RAN node forwards the received upstream PDU(s). The method may continue at operation 910.

FIG. 10 illustrates, in one embodiment, a method 1000 performed at a WD, such as WD 614, for synchronising communications with a RAN node, such as RAN node 612, using a provisioned set of synchronised communication configurations and PCSI monitoring occasions.

At operation 1010, the WD receives a periodic communications synchronisation indicator (PCSI) during a PCSI monitoring occasion.

At operation 1020, the WD identifies a synchronised communication configuration associated with the PCSI and accesses, in a memory of the WD, the synchronised communication configuration from a set of provisioned synchronised communication configurations stored therein, each synchronised communication configuration of the set including a downlink portion and an uplink portion for exchange of respective downlink and uplink data transmissions between the RAN node and the WD and a sidelink portion for sidelink transmissions between neighbouring WDs.

At operation 1030, the WD identifies an activation time interval associated with the synchronised communication configuration.

At operation 1040, at a time following reception of the PCSI indicated by the activation time interval, the WD activates the synchronised communication configuration.

At operation 1050, in FIG. 10A, the WD receives a downstream PDU in accordance with the downlink portion of the synchronised communication configuration associated with the PCSI.

At operation 1060, in FIG. 10A, the WD transmits an upstream PDU in accordance with the uplink portion of the synchronised communication configuration associated with the PCSI. The procedure may continue at operation 1010.

Figure 10B:
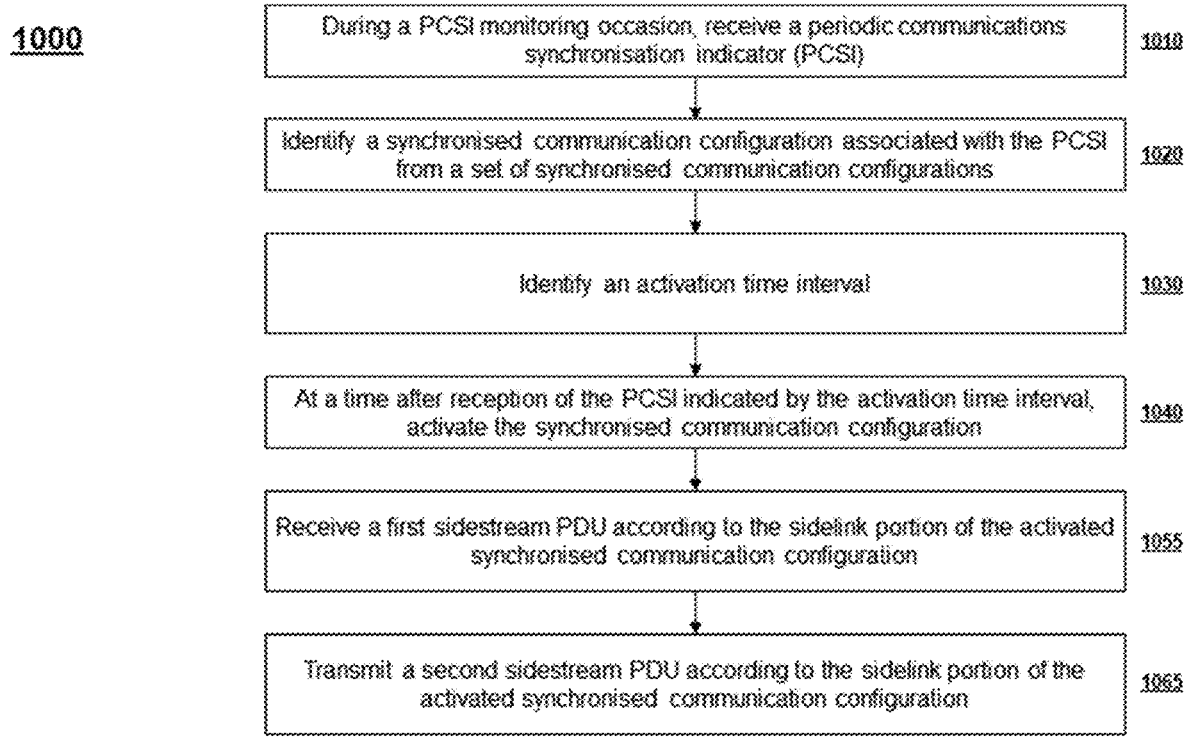
FIG. 10B illustrates, in one embodiment, further aspects of a method performed at a WD for reception and transmission of sidestream PDUs using a provisioned set of synchronised communication configurations and PCSI monitoring occasions.

FIG. 10B illustrates, in one embodiment, further aspects of method 1000 performed at a WD, such as WD 614, for reception and transmission of sidestream PDUs using a provisioned set of synchronised communication configurations and PCSI monitoring occasions.

At operation 1055, the WD receives a first sidestream PDU in accordance with the sidelink portion of the synchronised communication configuration associated with the PCSI.

At operation 1065, the WD transmits a second sidestream PDU in accordance with the sidelink portion of the synchronised communication configuration associated with the PCSI. The second sidestream PDU may be transmitted either in response to a first sidestream PDU received in operation 1055 or in response to a downstream PDU received in operation 1050.

Figure 11:
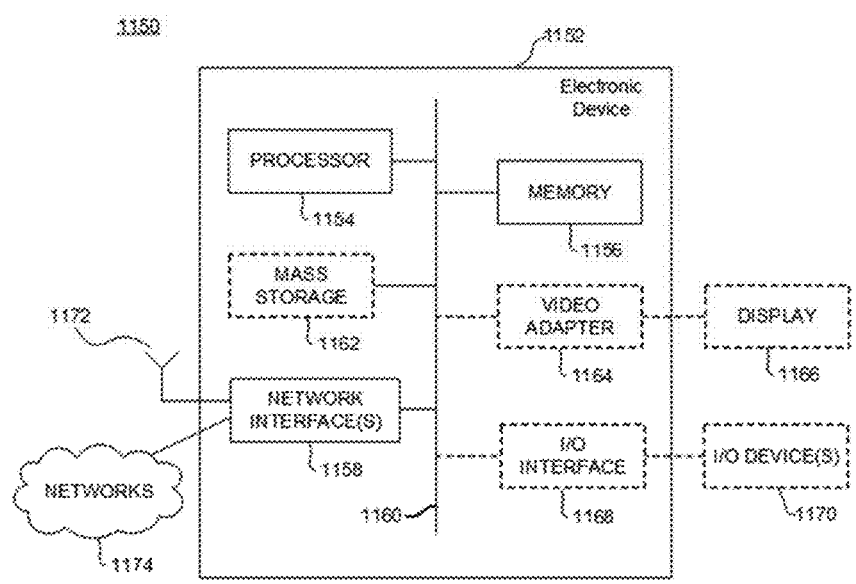
FIG. 11 illustrates, in one embodiment, a block diagram of an electronic device (ED) illustrated within a computing and communications environment.

FIG. 11 is a block diagram of an electronic device (ED) 1152 illustrated within a computing and communications environment 1150 that may be used for implementing the devices and methods disclosed herein. In some embodiments, the ED 1152 may be an element (e.g., a physical network element) of communications network infrastructure, such as RAN node 612 (which may be, for example, a base station, a NodeB, an evolved Node B (eNodeB or eNB), a fifth generation new radio (5G NR) NodeB (sometimes referred to as a gNodeB, ng-eNB or gNB), a centralised unit (CU), or a distributed unit (DU)), a home subscriber server (HSS), a gateway (GW) such as a packet gateway (PGW), a serving gateway (SGW), a user plane gateway (UPGW) or various other nodes or functions within a public land mobile network (PLMN). In other embodiments, the ED 1152 may be device that connects to the network infrastructure over a radio interface, such as a mobile phone, smart phone or other such device that may be classified as a User Equipment (UE). In some embodiments, the ED 1152 may be a machine type communications (MTC) device (also referred to as a machine-to-machine (m2m) device), or another such device that may be categorized as a UE despite not providing a direct service to a user. In some references, an ED 1152 may also be referred to as a mobile device, a term intended to reflect devices that connect to a mobile network, regardless of whether the device itself is designed for, or capable of, mobility. In an embodiment, an ED 1152 may be a wireless device (WD) such as WD 614, a term intended to reflect devices that connect to a network via a radio link. Specific devices may utilize all of the components shown or only a subset of the components, and levels of integration may vary from device to device. Furthermore, a device may contain multiple instances of a component, such as multiple processors, memories, transmitters, receivers, etc. The ED 1152 typically includes a processor 1154, such as a Central Processing Unit (CPU) and may further include specialized processors such as a Graphics Processing Unit (GPU) or other such processor, a memory 1156, a network interface 1158 and a bus 1160 to connect the components of ED 1152. ED 1152 may optionally also include components such as a mass storage device 1162, a video adapter 1164, and an I/O interface 1168 (shown in dashed outline).

The memory 1156 may comprise any type of non-transitory system memory, readable by the processor 1154, such as static random access memory (SRAM), dynamic random access memory (DRAM), synchronous DRAM (SDRAM), read-only memory (ROM), or a combination thereof. In an embodiment, the memory 1156 may include more than one type of memory, such as ROM for use at boot-up, and DRAM for program and data storage for use while executing programs. The bus 1160 may be one or more of any type of several bus architectures including a memory bus or memory controller, a peripheral bus, or a video bus.

The ED 1152 may also include one or more network interfaces 1158, which may include at least one of a wired network interface and a wireless network interface. As illustrated in FIG. 11, a network interface 1158 may include a wired network interface to connect to a network 1174, and also may include a radio access network interface 1172 for connecting to other devices over a radio link. When ED 1152 is a network infrastructure element, the radio access network interface 1172 may be omitted for nodes or functions acting as elements of the public land mobile network (PLMN) other than those at the radio edge (e.g. a DU). When ED 1152 is infrastructure at the radio edge of a network 1174, both wired and wireless network interfaces may be included. When ED 1152 is a wirelessly connected device, such as a UE or WD, radio access network interface 1172 may be present and it may be supplemented by other wireless interfaces such as WiFi network interfaces. The network interfaces 1158 allow the ED 1152 to communicate with remote entities such as those connected to network 1174.

The mass storage 1162 may comprise any type of non-transitory storage device configured to store data, programs and other information and to make the data, programs and other information accessible via the bus 1160. The mass storage 1162 may comprise, for example, one or more of a solid state drive, hard disk drive, a magnetic disk drive or an optical disk drive. In some embodiments, mass storage 1162 may be remote to ED 1152 and accessible through use of a network interface such as interface 1158. In the illustrated embodiment, mass storage 1162 is distinct from memory 1156 where it is included and may generally perform storage tasks compatible with higher latency, but may generally provide lesser or no volatility. In some embodiments, mass storage 1162 may be integrated with a heterogeneous memory 1156.

The optional video adapter 1164 and the I/O interface 1168 (shown in dashed outline) provide interface to couple the ED 1152 to external input and output devices. Examples of input and output devices include a display 1166 coupled to the video adapter 1164 and an I/O device 1170 such as a touch-screen coupled to the I/O interface 1168. Other devices may be coupled to the ED 1152, and additional or fewer interfaces may be utilized. For example, a serial interface such as a Universal Serial Bus (USB) (not shown) may be used to provide an interface for an external device. Those skilled in the art will appreciate that in embodiments in which ED 1152 is part of a data center, I/O interface 1168 and Video Adapter 1164 may be virtualized and provided through network interface 1158.

In some embodiments, ED 1152 may be a stand-alone device, while in other embodiments ED 1152 may be resident within a data center. A data center, as will be understood in the art, is a collection of computing resources (typically in the form of services) that can be used as a collective computing and storage resource. Within a data center, a plurality of services can be connected together to provide a computing resource pool upon which virtualized entities can be instantiated.

Figure 12:
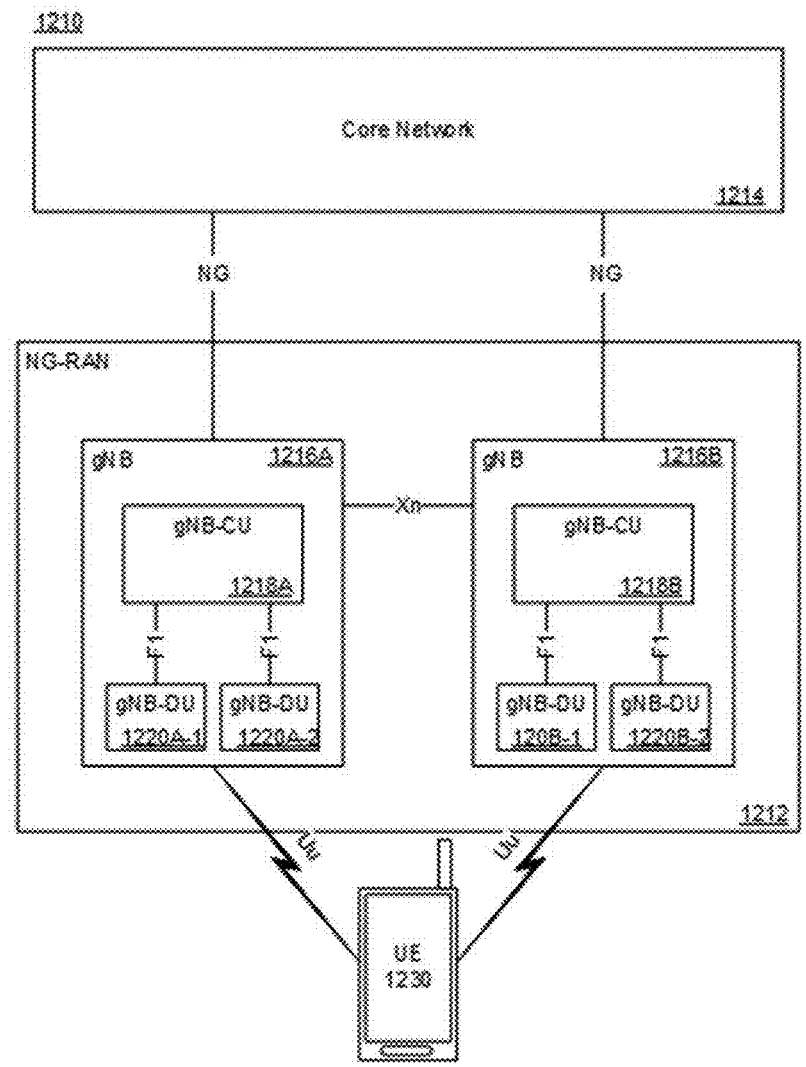
FIG. 12 illustrates, in one embodiment, an architecture for implementation of a Next Generation Radio Access Network (NG-RAN).

FIG. 12 illustrates the architecture 1210 for the implementation of a Next Generation Radio Access Network (NG-RAN) 1212, also referred to as a 5G RAN. NG-RAN 1212 is the radio access network that connects a UE 1230 to a core network (CN) 1214. The UE 1230 may, for example, be a WD 614. Those skilled in the art will appreciate that CN 1214 may be the SGCN. In other embodiments, the CN 1214 may be a 4G Evolved Packet Core (EPC) network. Nodes within NG-RAN 1212 connect to the CN 1214 over an NG interface. This NG interface can comprise both the NG-C interface to a CN control plane function (CPF) and an NG-U interface to a CN user plane function (UPF). NG-RAN 1212 includes a plurality of radio access network (RAN) nodes, including the RAN node 612, that can be referred to as a gNB 1216. In the NG-RAN 1212, gNB 1216A and gNB 1216B are able to communicate with each other over an Xn interface. Within a single gNB 1216A, the functionality of the gNB may be decomposed into a centralized unit (gNB-CU) 1218A and a set of distributed units (gNB-DU 1220A-1 and gNB-DU 1220A-2, collectively referred to as 1220A). gNB-CU 1218A is connected to a gNB-DU 1220A over an F1 interface. Similarly, gNB 1216B has a gNB-CU 1218B connecting to a set of distributed units gNB-DU 1220B-1 and gNB-DU 1220B-2, collectively referred to as 1220B). Each gNB DU may be responsible for one or more cells providing radio coverage within the PLMN to one or more UEs 1230. In other examples, an NG RAN node may be referred to as an ng-eNB where an ng-eNB-CU is connected to an ng-eNB-DU over a V1 interface.

It should also be understood that any or all of the functions discussed above with respect to the NG-RAN 1212 may be virtualized within, for example, the resource pool of a network data center.

Although the present disclosure describes the methods of the present disclosure with reference to a process control system, it will be appreciated that the method of the present disclosure may be performed by RAN nodes and wireless devices of any type of 3GPP wireless system where the periodic arrival of downstream user plane PDUs at a RAN node must be synchronised with provisioned downlink, uplink and sidelink transmissions that may be triggered by a downstream user plane PDU.

In an embodiment, the present disclosure provides a method of synchronising communications between a radio access network (RAN) node and a wireless device (WD) provisioned with a set of synchronised communication configurations. The method includes: after receiving, by the RAN node, a downstream protocol data unit (PDU), selecting a synchronised communication configurations from the set of synchronised communication configurations where each synchronised communication configuration includes a downlink portion for downlink data transmissions to the WD and an uplink portion for uplink data transmissions from the WD, respective ones of the set of synchronised communication configurations being associated with a periodic communications synchronisation indicator (PCSI); transmitting, by the RAN node to the WD, the PCSI associated with the selected synchronised communication configuration; transmitting, by the RAN node to the WD, at a pre-determined interval following transmission of the PCSI, the downstream PDU in accordance with the downlink portion of the selected synchronised communication configuration; and receiving, by the RAN node, an upstream PDU transmitted by the WD in accordance with the uplink portion of the selected synchronised communication configuration.

In some embodiments, the PCSI is valid for a single process loop control (PLC) cycle, and wherein the downstream PDU is transmitted to the WD and the upstream PDU is received from the WD during the PLC cycle.

In some embodiments, for each of the set of synchronised communication configurations, the downlink portion defines parameters and radio resources for downlink data transmissions of downstream PDUs from the RAN node to the WD, and the uplink portion defines parameters and radio resources for uplink data transmissions of upstream PDUs from the WD to the RAN node.

In some embodiments, the parameters and radio resources comprises one or more of: an initial time domain resource allocation, including sub-frame offset, start symbol and number of symbols; an initial frequency domain resource allocation, including a starting resource block and a number of resource blocks; a modulation and coding scheme; a demodulation reference signal; a number of transmission repetitions; a time interval between initial and repeated transmissions, if time domain diversity is used; a frequency offset between initial and repeated transmissions, if frequency domain diversity is used; a redundancy version (RV) sequence to use for repetitions; a frequency hopping configuration for repeated transmissions; a time domain interval for subsequent resource allocations, including number of nanoseconds, number of symbols, number of slots and number of sub-frames; and a frequency domain interval for subsequent resource allocations, including number of resource blocks, bandwidth part identifier, and component carrier identifier.

In some embodiments, the PCSI comprises an unmodulated signal.

In some embodiments, the PCSI comprises a downlink control information (DCI) message that is encoded with a radio network temporary identifier (RNTI).

In some embodiments, receiving the downstream PDU comprises receiving, by the RAN node, the downstream PDU from a user plane (UP) component.

In another embodiment, the present disclosure provides a radio access network (RAN) node for a wireless communication network that includes a network interface for receiving and transmitting protocol data units (PDUs); a radio network interface for wirelessly receiving and transmitting PDUs; a processor; and a memory device. The memory device stores in instructions that when executed by the processor cause the RAN node to: after receiving a downstream PDU using the network interface, select a synchronised communication configuration from a set of synchronised communication configurations where each synchronised communication configuration includes a downlink portion for downlink data transmissions and an uplink portion for uplink data transmissions, respective ones of the set of synchronised communication configurations being associated with a periodic communications synchronisation indicator (PCSI); transmit, using the radio network interface, a PCSI associated with the selected synchronised communication configuration; transmit, using the radio network interface, at a pre-determined interval following transmission of the PCSI, the downstream PDU in accordance with the downlink portion of the selected synchronised communication configuration; and receive, using the radio network interface, an upstream PDU in accordance with the uplink portion of the selected synchronised communication configuration.

In some embodiments, the PCSI is valid for a single process loop control (PLC) cycle, and wherein the downstream PDU is transmitted by the RAN node and the upstream PDU is received by the RAN node during the PLC cycle.

In some embodiments, for each of the set of synchronised communication configurations, the downlink portion defines parameters and radio resources for downlink data transmissions of downstream PDUs by the RAN node, and the uplink portion defines parameters and radio resources for uplink data reception of upstream PDUs by the RAN node.

In some embodiments, the parameters and radio resources comprises one or more of: an initial time domain resource allocation, including sub-frame offset, start symbol and number of symbols; an initial frequency domain resource allocation, including a starting resource block and a number of resource blocks; a modulation and coding scheme; a demodulation reference signal; a number of transmission repetitions; a time interval between initial and repeated transmissions, if time domain diversity is used; a frequency offset between initial and repeated transmissions, if frequency domain diversity is used; a redundancy version (RV) sequence to use for repetitions; a frequency hopping configuration for repeated transmissions; a time domain interval for subsequent resource allocations, including number of nanoseconds, number of symbols, number of slots and number of sub-frames; and a frequency domain interval for subsequent resource allocations, including number of resource blocks, bandwidth part identifier, and component carrier identifier.

In some embodiments, the PCSI comprises an unmodulated signal.

In some embodiments, the PCSI comprises a downlink control information (DCI) message that is encoded with a radio network temporary identifier (RNTI).

In some embodiments, the DCI message includes an identifier associated with the selected synchronised communication configuration.

In some embodiments, the DCI message includes an identifier associated with the selected synchronised communication configuration.

In another embodiment, the present disclosure provides a method of synchronising communications between a wireless device (WD) and a radio access network (RAN) node. The method includes receiving, at the WD, a periodic communications synchronisation indicator (PCSI) from the RAN node; accessing, in a memory of the WD, a synchronised communication configuration associated with the PCSI from a set of provisioned synchronised communication configurations stored therein, each synchronised communication configuration of the set including a downlink portion for downlink data transmissions to the WD and an uplink portion for uplink data transmissions from the WD; activating, at a pre-determined interval following reception of the PCSI, the synchronised communication configuration associated with the PCSI; receiving, by the WD from the RAN node, a downstream protocol data unit (PDU) in accordance with the downlink portion of the synchronised communication configuration associated with the PCSI; and transmitting, by the WD to the RAN node, an upstream PDU in accordance with the uplink portion of the synchronised communication configuration associated with the PCSI.

In some embodiments, the WD is provisioned with the set of synchronised communication configurations, and the WD uses the PCSI as a reference to access the associated one of the set of synchronised communication configurations.

In some embodiments, the PCSI is valid for a single process loop control (PLC) cycle, and the downstream PDU to the WD and the upstream PDU from the WD are transmitted during the PLC cycle.

In some embodiments, for each of the set of synchronised communication configurations, the downlink portion defines parameters and radio resources for downlink data transmissions from the RAN node to the WD, and the uplink portion defines parameters and radio resources for uplink data transmissions from the WD to the RAN node.

In some embodiments, wherein the parameters and radio resources comprises one or more of: an initial time domain resource allocation, including sub-frame offset, start symbol and number of symbols; an initial frequency domain resource allocation, including a starting resource block and a number of resource blocks; a modulation and coding scheme; a demodulation reference signal; a number of transmission repetitions; a time interval between initial and repeated transmissions, if time domain diversity is used; a frequency offset between initial and repeated transmissions, if frequency domain diversity is used; a redundancy version (RV) sequence to use for repetitions; a frequency hopping configuration for repeated transmissions; a time domain interval for subsequent resource allocations, including number of nanoseconds, number of symbols, number of slots and number of sub-frames; and a frequency domain interval for subsequent resource allocations, including number of resource blocks, bandwidth part identifier, and component carrier identifier.

In some embodiments, the PCSI comprises an unmodulated signal.

In some embodiments, the PCSI comprises a downlink control information (DCI) message that is encoded with a radio network temporary identifier (RNTI).

In some embodiments, the DCI message includes an identifier associated with the synchronised communication configuration.

In another embodiment, the present disclosure provides a wireless device radio network interface for receiving and transmitting protocol data units (PDUs); a processor; and a memory device. The memory device stores instructions that when executed by the processor cause the WD to: receive, using the radio network interface, a periodic communications synchronisation indicator (PCSI); access, in a memory of the WD, a synchronised communication configuration associated with the PCSI from a set of synchronised communication configurations stored therein, each synchronised communication configuration of the set including a downlink portion for downlink data transmissions and an uplink portion for uplink data transmissions; activate, at a pre-determined interval following reception of the PCSI, the synchronised communication configuration associated with the PCSI; receive, using the radio network interface, a downstream PDU in accordance with the downlink portion of the synchronised communication configuration associated with the PCSI; and transmit, using the radio network interface, an upstream PDU in accordance with the uplink portion of the synchronised communication configuration associated with the PCSI.

In some embodiments, the WD is provisioned with the set of synchronised communication configurations, and the WD uses the PCSI as a reference to access the associated one of the set of synchronised communication configurations.

In some embodiments, the PCSI is valid for a single process loop control (PLC) cycle, and the downstream PDU received by the WD and the upstream PDU transmitted by the WD are transmitted during the PLC cycle.

In some embodiments, for each of the set of synchronised communication configurations, the downlink portion defines parameters and radio resources for downlink data transmissions to the WD, and the uplink portion defines parameters and radio resources for uplink data transmissions from the WD.

In some embodiments, the parameters and radio resources comprises one or more of: an initial time domain resource allocation, including sub-frame offset, start symbol and number of symbols; an initial frequency domain resource allocation, including a starting resource block and a number of resource blocks; a modulation and coding scheme; a demodulation reference signal; a number of transmission repetitions; a time interval between initial and repeated transmissions, if time domain diversity is used; a frequency offset between initial and repeated transmissions, if frequency domain diversity is used; a redundancy version (RV) sequence to use for repetitions; a frequency hopping configuration for repeated transmissions; a time domain interval for subsequent resource allocations, including number of nanoseconds, number of symbols, number of slots and number of sub-frames; and a frequency domain interval for subsequent resource allocations, including number of resource blocks, bandwidth part identifier, and component carrier identifier.

In some embodiments, the PCSI comprises an unmodulated signal.

In some embodiments, the PCSI comprises a downlink control information (DCI) message that is encoded with a radio network temporary identifier (RNTI).

In some embodiments, the DCI message includes an identifier associated with the synchronised communication configuration.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method of synchronising communications between a radio access network (RAN) node and one or more wireless devices (WDs), the method comprising:
   transmitting, by the RAN node to the one or more WDs, a set of synchronised communication configurations, each synchronised communication configuration including a downlink portion governing downlink user plane transmissions from the RAN node to one or more of the WDs and an uplink portion governing uplink user plane transmissions from one or more of the WDs to the RAN node, respective ones of the set of synchronised communication configurations being associated with a periodic communications synchronisation indicator (PCSI);
   receiving, by the RAN node, a downstream user plane protocol data unit (PDU) and associating, by the RAN node, a time mark with the received downstream user plane PDU;
   selecting, based at least on the time mark, by the RAN node, a synchronised communication configuration from the set of synchronised communication configurations;
   transmitting, by the RAN node to the one or more WDs, the PCSI associated with the synchronised communication configuration selected from the set of synchronised communication configurations;
   transmitting, by the RAN node to the one or more WDs, at a pre-determined interval following transmission of the PCSI, the downstream user plane PDU in accordance with the downlink portion of the selected synchronised communication configuration; and
   receiving, by the RAN node, at least one upstream user plane PDU transmitted by at least one WD of the one or more WDs in accordance with the uplink portion of the selected synchronised communication configuration.

2. The method of claim 1 wherein each synchronised communication configuration further includes a sidelink portion governing sidelink user plane transmissions between at least two WDs of the one or more of the WDs.

3. The method of claim 1 wherein the PCSI is valid for a single process loop control (PLC) cycle, and wherein the downstream user plane PDU is transmitted to the one or more WDs and the at least one upstream user plane PDU is received from the at least one WD of the one or more WDs during the PLC cycle.

4. The method of claim 2 wherein, for each of the set of synchronised communication configurations, the downlink portion defines parameters and radio resources for downlink transmissions of downstream user plane PDUs from the RAN node to at least one WD of the one or more WDs, the uplink portion defines parameters and radio resources for uplink transmissions of upstream user plane PDUs from at least one WD of the one or more WDs to the RAN node, and the sidelink portion defines parameters and radio resources for sidelink transmissions of sidestream user plane PDUs from at least one first WD of the one or more WDs to at least one second WD of the one or more WDs.

5. The method of claim 4 wherein the parameters and radio resources comprises one or more of:

an initial time domain resource allocation, including sub-frame offset, start symbol and number of symbols;
an initial frequency domain resource allocation, including a starting resource block and a number of resource blocks;
a modulation and coding scheme;
a demodulation reference signal;
a number of transmission repetitions;
a time interval between initial and repeated transmissions, if time domain diversity is used;
a frequency offset between initial and repeated transmissions, if frequency domain diversity is used;
a redundancy version (RV) sequence to use for repeated transmission;
a frequency hopping configuration for repeated transmissions;
a time domain interval for subsequent resource allocations, including number of nanoseconds, number of symbols, number of slots and number of sub-frames; and
a frequency domain interval for subsequent resource allocations, including number of resource blocks, bandwidth part identifier, and component carrier identifier.

6. The method of claim 1 wherein the PCSI comprises an unmodulated signal.

7. The method of claim 1 wherein the PCSI comprises a downlink control information (DCI) message that is encoded with a radio network temporary identifier (RNTI).

8. The method of claim 7 wherein the DCI message includes an identifier associated with the selected synchronised communication configuration.

9. The method of claim 1 wherein receiving the downstream user plane PDU comprises receiving, by the RAN node, the downstream user plane PDU from a core network (CN) component.

10. A radio access network (RAN) node for a wireless communication network, the RAN node comprising:
a network interface for receiving and transmitting protocol data units (PDUs);
a radio network interface for wirelessly receiving and transmitting PDUs;
a processor; and
a memory device storing instructions that when executed by the processor cause the RAN node to:
transmit to the one or more wireless devices (WDs) a set of synchronised communication configurations, each synchronised communication configuration including a downlink portion governing downlink user plane transmissions from the RAN node to one or more of the WDs and an uplink portion governing uplink user plane transmissions from one or more of the WDs to the RAN node, respective ones of the set of synchronised communication configurations being associated with a periodic communications synchronisation indicator (PCSI);
receive a downstream protocol data unit (PDU) and associate a time mark with the received downstream user plane PDU;
select, based at least on the time mark, a synchronised communication configuration from the set of synchronised communication configurations;
transmit to the one or more WDs the PCSI associated with the synchronised communication configuration selected from the set of synchronised communication configurations;
transmit to the one or more WDs at a pre-determined interval following transmission of the PCSI, the downstream user plane PDU in accordance with the downlink portion of the selected synchronised communication configuration; and
receive at least one upstream user plane PDU transmitted by at least one WD of the one or more WDs in accordance with the uplink portion of the selected synchronised communication configuration.

11. The RAN node of claim 10 wherein each synchronised communication configuration further includes a sidelink portion governing sidelink user plane transmissions between at least two WDs of the one or more of the WDs.

12. The RAN node of claim 10 wherein the PCSI is valid for a single process loop control (PLC) cycle, and wherein the downstream user plane PDU is transmitted to the one or more WDs and the at least one upstream user plane PDU is received from the at least one WD of the one or more WDs during the PLC cycle.

13. The RAN node of claim 12 wherein, for each of the set of synchronised communication configurations, the downlink portion defines parameters and radio resources for downlink transmissions of downstream user plane PDUs from the RAN node to at least one WD of the one or more WDs, the uplink portion defines parameters and radio resources for uplink transmissions of upstream user plane PDUs from at least one WD of the one or more WDs to the RAN node, and the sidelink portion defines parameters and radio resources for sidelink transmissions of sidestream user plane PDUs from at least one first WD of the one or more WDs to at least one second WD of the one or more WDs.

14. A method comprising:
at a wireless device (WD):
receiving a set of synchronised communication configurations where each synchronised communication configuration includes a downlink portion governing downlink user plane transmissions to the WD and an uplink portion governing uplink user plane transmissions from the WD, respective ones of the set of synchronised communication configurations being associated with a periodic communications synchronisation indicator (PCSI);
receiving a PCSI;
receiving a downstream user plane protocol data unit (PDU) in accordance with the downlink portion of a selected synchronised communication configuration, the selected synchronised communication configuration associated with the PCSI, the downlink portion defining parameters and radio resources for downlink user plane transmissions to the WD; and
transmitting an upstream user plane PDU in accordance with the uplink portion of the selected synchronised communication configuration, the uplink portion defining parameters and radio resources for uplink user plane transmissions from the WD.

15. The method of claim 14 wherein each synchronised communication configuration further includes a sidelink portion defining parameters and radio resources for sidelink user plane transmissions to and from the WD.

16. The method of claim 14 wherein the PCSI is valid for a single process loop control (PLC) cycle, and the downstream user plane PDU to the WD and the upstream user plane PDU from the WD are transmitted during the PLC cycle.

17. The method of claim 14 wherein the parameters and radio resources comprises one or more of:
an initial time domain resource allocation, including sub-frame offset, start symbol and number of symbols;

an initial frequency domain resource allocation, including a starting resource block and a number of resource blocks;

a modulation and coding scheme;

a demodulation reference signal;

a number of transmission repetitions;

a time interval between initial and repeated transmissions, if time domain diversity is used;

a frequency offset between initial and repeated transmissions, if frequency domain diversity is used;

a redundancy version (RV) sequence to use for repeated transmissions;

a frequency hopping configuration for repeated transmissions;

a time domain interval for subsequent resource allocations, including number of nanoseconds, number of symbols, number of slots and number of sub-frames; and a frequency domain interval for subsequent resource allocations, including number of resource blocks, bandwidth part identifier, and component carrier identifier.

18. The method of claim 14 wherein the PCSI comprises an unmodulated signal.

19. The method of claim 14 wherein the PCSI comprises a downlink control information (DCI) message that is encoded with a radio network temporary identifier (RNTI) and wherein the DCI message includes an identifier associated with the synchronised communication configuration.

20. The method of claim 14 further comprising:

activating the selected synchronised communication configuration at a pre-determined interval after receiving the PCSI.

* * * * *